(12) United States Patent
Ohmoto et al.

(10) Patent No.: US 10,363,720 B2
(45) Date of Patent: Jul. 30, 2019

(54) LAMINATED GLASS AND METHOD OF MOUNTING LAMINATED GLASS

(71) Applicant: SEKISUI CHEMICAL CO., LTD., Osaka, Osaka (JP)

(72) Inventors: Izumi Ohmoto, Kouka (JP); Daisuke Nakajima, Kouka (JP); Daizou Ii, Kouka (JP); Juichi Fukatani, Tokyo (JP)

(73) Assignee: SEKISUI CHEMICAL CO., LTD., Osaka (JP)

( * ) Notice: Subject to any disclaimer, the term of this patent is extended or adjusted under 35 U.S.C. 154(b) by 0 days.

(21) Appl. No.: 14/418,919

(22) PCT Filed: Jul. 31, 2013

(86) PCT No.: PCT/JP2013/070819
§ 371 (c)(1),
(2) Date: Jan. 30, 2015

(87) PCT Pub. No.: WO2014/021406
PCT Pub. Date: Feb. 6, 2014

(65) Prior Publication Data
US 2015/0210043 A1  Jul. 30, 2015

(30) Foreign Application Priority Data

Jul. 31, 2012 (JP) .................................. 2012-170289
Jul. 31, 2012 (JP) .................................. 2012-170290

(51) Int. Cl.
*B32B 17/10* (2006.01)
*B32B 27/30* (2006.01)
*G02B 5/28* (2006.01)

(52) U.S. Cl.
CPC .. *B32B 17/10761* (2013.01); *B32B 17/10036* (2013.01); *B32B 17/10431* (2013.01);
(Continued)

(58) Field of Classification Search
CPC ........ B32B 17/10036; B32B 17/10431; B32B 17/10633; B32B 17/10651; B32B 17/10678; B32B 17/10761; B32B 27/306
See application file for complete search history.

(56) References Cited

U.S. PATENT DOCUMENTS 5,126,237 A * 6/1992 Okumura ................. G03C 1/12
430/139
5,340,654 A    8/1994 Ueda et al.
(Continued)

FOREIGN PATENT DOCUMENTS

CN      102333739 A     1/2012
EP      2 471 762 A1    7/2012
(Continued)

OTHER PUBLICATIONS

International Search Report for the Application No. PCT/JP2013/070819 dated Sep. 3, 2013.
(Continued)

*Primary Examiner* — William R Alexander
*Assistant Examiner* — Ephrem Z Mebrahtu
(74) *Attorney, Agent, or Firm* — Cheng Law Group, PLLC (57) ABSTRACT

There is provided laminated glass which is high in heat shielding properties. The laminated glass according to the present invention is provided with a first laminated glass member, a second laminated glass member and an interlayer film arranged between the first and second laminated glass members; the interlayer film is provided with an infrared ray reflection layer which reflects infrared rays, a first resin layer which is arranged on a first surface side of the infrared ray reflection layer and contains a thermoplastic resin, and a second resin layer which is arranged on a second surface side of the infrared ray reflection layer and contains a thermoplastic resin; and the infrared ray transmittance in the (Continued)

wavelength of 780 to 2100 nm of the whole layer composed of the first laminated glass member and the first resin layer is higher than the infrared ray transmittance in the wavelength of 780 to 2100 nm of the whole layer composed of the first laminated glass member and the second resin layer.

15 Claims, 1 Drawing Sheet

(52) U.S. Cl.
CPC .. *B32B 17/10633* (2013.01); *B32B 17/10651* (2013.01); *B32B 17/10678* (2013.01); *B32B 27/306* (2013.01); *G02B 5/282* (2013.01); *G02B 5/287* (2013.01); *B32B 2307/412* (2013.01); *B32B 2419/00* (2013.01); *B32B 2605/00* (2013.01); *B32B 2605/08* (2013.01); *Y10T 29/49826* (2015.01); *Y10T 428/3163* (2015.04)

(56) References Cited

U.S. PATENT DOCUMENTS

| | | | |
|---|---|---|---|
| 5,618,863 | A | 4/1997 | D'Errico et al. |
| 6,673,456 | B1 | 1/2004 | Kobata et al. |
| 2002/0136906 | A1* | 9/2002 | Schohi ............. B32B 17/10761 428/437 |
| 2004/0234778 | A1 | 11/2004 | Fukatani et al. |
| 2005/0181220 | A1 | 8/2005 | Kobata et al. |
| 2006/0008640 | A1 | 1/2006 | Chonan et al. |
| 2006/0050425 | A1 | 5/2006 | Muromachi et al. |
| 2006/0110593 | A1 | 5/2006 | Fukatani et al. |
| 2006/0223922 | A1* | 10/2006 | Walker ................. C08K 5/1345 524/251 |
| 2007/0009714 | A1* | 1/2007 | Lee ................... B32B 17/10568 428/172 |
| 2007/0093581 | A1* | 4/2007 | Toyama ................. B32B 17/10 524/394 |
| 2007/0224340 | A1 | 9/2007 | Hatta et al. |
| 2007/0231584 | A1* | 10/2007 | Hasegawa ......... B32B 17/10339 428/428 |
| 2009/0035583 | A1 | 2/2009 | Fisher |
| 2009/0237782 | A1 | 9/2009 | Takamatsu et al. |
| 2010/0220388 | A1* | 9/2010 | Suzuki .................. B32B 17/10 359/359 |
| 2010/0326323 | A1 | 12/2010 | Abe et al. |
| 2011/0181820 | A1 | 7/2011 | Watanabe |
| 2011/0293857 | A1 | 12/2011 | Fukatani et al. |
| 2011/0300356 | A1 | 12/2011 | Takamatsu et al. |
| 2012/0095141 | A1* | 4/2012 | Tanabe .................. C08K 5/005 524/126 |
| 2012/0162752 | A1 | 6/2012 | Kitano et al. |
| 2012/0164457 | A1 | 6/2012 | Fukatani et al. |
| 2012/0171479 | A1 | 7/2012 | Fukatani et al. |
| 2012/0244363 | A1 | 9/2012 | Fisher |
| 2012/0250146 | A1 | 10/2012 | Tamai et al. |
| 2012/0288722 | A1* | 11/2012 | Iwamoto ........... B32B 17/10036 428/437 |

FOREIGN PATENT DOCUMENTS

| | | |
|---|---|---|
| JP | 10-17337 A | 1/1998 |
| JP | 2000-154046 A | 6/2000 |
| JP | 2004-26547 A | 1/2004 |
| JP | 2005-343723 A | 12/2005 |
| JP | 2007-084423 A | 4/2007 |
| JP | 2010-222233 A | 10/2010 |
| JP | 2010-265160 A | 11/2010 |
| JP | 2010-535695 A | 11/2010 |
| JP | 2012-101999 A | 5/2012 |
| JP | 2012-106931 A | 6/2012 |
| JP | 2012-126639 A | 7/2012 |
| JP | 2012-131659 A | 7/2012 |
| WO | WO-01/25162 A1 | 4/2001 |
| WO | WO-2004/000549 A1 | 12/2003 |
| WO | WO-2005/087680 A1 | 9/2005 |
| WO | WO-2008/149974 A1 | 12/2008 |
| WO | WO-2010/098287 A1 | 9/2010 |
| WO | WO-2011/074425 A1 | 6/2011 |
| WO | WO-2011/078314 A1 | 6/2011 |
| WO | WO-2012/050078 A1 | 4/2012 |

OTHER PUBLICATIONS

International Preliminary Report on Patentability (PCT/IPEA/409) for Application No. PCT/JP2013/070819 dated Oct. 8, 2014.
Notifications of the Third Party Observation (PCT/IB/345) for the Application No. PCT/JP2013/070819 from the International Bureau of WIPO dated Aug. 26, 2014.
International Search Report for the Application No. PCT/JP2013/070820 dated Sep. 3, 2013.
International Preliminary Report on Patentability (PCT/IPEA/409) for Application No. PCT/JP2013/070820 dated Oct. 8, 2014.
Notifications of the Third Party Observation (PCT/IB/345) for the Application No. PCT/JP2013/070820 from the International Bureau of WIPO dated Aug. 26, 2014.
Non-Final Office Action for the U.S. Appl. No. 14/418,931 from the USPTO dated Jun. 24, 2015.
International Preliminary Report on Patentability (PCT/IPEA/409) for Application No. PCT/JP2013/070819 dated Oct. 8, 2014 (English Translation dated Feb. 5, 2015).
International Preliminary Report on Patentability (PCT/IPEA/409) for Application No. PCT/JP2013/070820 dated Oct. 8, 2014 (English Translation dated Feb. 5, 2015).
The First Office Action for the Application No. 201380036241.5 from The State Intellectual Property Office of the People's Republic of China dated Apr. 1, 2016.
The First Office Action for the Application No. 201380036240.0 from The State Intellectual Property Office of the People's Republic of China dated Apr. 14, 2016.
Supplementary European Search Report for the Application No. EP 13 82 5101 dated Mar. 9, 2016.
Supplementary European Search Report for the Application No. EP 13 82 5301 dated Mar. 9, 2016.
Final Office Action for the U.S. Appl. No. 14/418,931 from the USPTO dated Jan. 11, 2016.
European Office Action for the Application No. 13 825 101.2 dated Apr. 6, 2017.
Notification of Reasons for Refusal for the Application No. 2013-547764 from Japan Patent Office dated Oct. 11, 2016.
Notification of Reasons for Refusal for the Application No. 2013-547766 from Japan Patent Office dated Oct. 11, 2016.
Chinese Office Action for Application No. 201380036240.0 dated Sep. 27, 2017.
Shen, Duanxiong et al., "Reflective heat insulation materials—pull hot metal insulation foil", Energy Efficiency in Buildings, China Architecture & Building Press, 2006, pp. 130-134.
Zhao, Zeqing et al., "The Conductive and Antistatic Technology Application of the Polymer Materials", China Textile & Apparel Press, 2006, p. 446.
Notification of Reasons for Refusal for the Application No. 2017-093023 from Japan Patent Office dated Sep. 5, 2018.
Notification of Reasons for Refusal for the Application No. 2017-093024 from Japan Patent Office dated Sep. 5, 2018.
Liu, Rong et al., "Degradation of poly(vinyl butyral) and its stabilization by bases", Polymer Degradation and Stability, 2008, vol. 93, pp. 846-853.
Extract from Kirk-Othmer Encyclopedia of Chemical Technology, Third Edition, vol. 23, pp. 615-627.
Extract from Kirk-Othmer Encyclopedia of Chemical Technology, Third Edition, vol. 23, pp. 798-813.
Extract from Kirk-Othmer Encyclopedia of Chemical Technology, Third Edition, vol. 13, pp. 978-991.
Notice of Opposition to Patent No. Ep 2883847 from the European Patent Office dated Dec. 17, 2018.

(56) References Cited

OTHER PUBLICATIONS

Japanese Office Action for Application No. 2017-093023 dated Mar. 5, 2019.
Japanese Office Action for Application No. 2017-093024 dated Mar. 5, 2019.
Notice of Opposition to Patent No. EP 2883848 from the European Patent Office dated Mar. 4. 2019.
Non-Final Office Action for the U.S. Appl. No. 14/418,931 from the United States Patent and Trademark Office dated May 2, 2019.

* cited by examiner

LAMINATED GLASS AND METHOD OF MOUNTING LAMINATED GLASS

TECHNICAL FIELD

The present invention relates to laminated glass used for laminated glass of automobiles, buildings and the like. Moreover, the present invention relates to a method of mounting the laminated glass.

BACKGROUND ART

Since laminated glass generates only a small amount of scattering glass fragments even when subjected to external impact and broken, laminated glass is excellent in safety. As such, the laminated glass is widely used for automobiles, railway vehicles, aircraft, ships, buildings and the like. The laminated glass is produced by sandwiching an interlayer film for laminated glass between a pair of glass plates. Such laminated glass used for the opening part of vehicles and buildings is required to have high heat shielding properties.

The energy amount of an infrared ray with a wavelength of 780 nm or more which is longer than that of visible light is small compared to an ultraviolet ray. However, the thermal action of infrared rays is large, and when infrared rays are absorbed into a substance, heat is released from the substance. As such, infrared rays are generally called heat rays. Thus, in order to enhance the heat shielding properties of laminated glass, it is necessary to sufficiently cut off infrared rays.

As an interlayer film including heat shielding particles for effectively cutting off the infrared rays (heat rays), the following Patent Document 1 discloses an interlayer film including tin-doped indium oxide particles (ITO particles) or antimony-doped tin oxide particles (ATO particles). The following Patent Document 2 discloses an interlayer film including tungsten oxide particles.

RELATED ART DOCUMENT

Patent Document

Patent Document 1: WO 2001/025162 A1
Patent Document 2: WO 2005/087680 A1

SUMMARY OF THE INVENTION

Problems to be Solved by the Invention

In recent years, laminated glass using an interlayer film has been required to achieve both high heat shielding properties and high visible light transmittance (Visible Transmittance) at the same time. That is, with regard to the laminated glass, it is necessary to enhance the heat shielding properties while maintaining the visible light transmittance high.

However, there are cases where high heat shielding properties and high visible light transmittance cannot be achieved at the same time by the conventional laminated glass such as those described in Patent Documents 1 and 2.

An object of the present invention is to provide laminated glass which is high in heat shielding properties, and a method of mounting the laminated glass.

An object of the present invention with limitation is to provide laminated glass which is high in heat shielding properties and high in visible light transmittance, and a method of mounting the laminated glass.

Means for Solving the Problems

According to a broad aspect of the present invention, there is provided laminated glass including a first laminated glass member, a second laminated glass member and an interlayer film arranged between the first laminated glass member and the second laminated glass member, the interlayer film being provided with an infrared ray reflection layer which reflects infrared rays, a first resin layer which is arranged on a first surface side of the infrared ray reflection layer and contains a thermoplastic resin, and a second resin layer which is arranged on a second surface side opposite to the first surface of the infrared ray reflection layer and contains a thermoplastic resin, the first laminated glass member being arranged on the outside of the first resin layer in the interlayer film, the second laminated glass member being arranged on the outside of the second resin layer in the interlayer film, and the infrared ray transmittance in the wavelength of 780 to 2100 nm of the whole layer composed of the first laminated glass member and the first resin layer being higher than the infrared ray transmittance in the wavelength of 780 to 2100 nm of the whole layer composed of the second laminated glass member and the second resin layer.

In a specific aspect of the laminated glass according to the present invention, the infrared ray transmittance in the wavelength of 780 to 2100 nm of the first resin layer is higher than the infrared ray transmittance in the wavelength of 780 to 2100 nm of the second resin layer, or the infrared ray transmittance in the wavelength of 780 to 2100 nm of the first laminated glass member is higher than the infrared ray transmittance in the wavelength of 780 to 2100 nm of the second laminated glass member.

In another specific aspect of the laminated glass according to the present invention, the infrared ray transmittance in the wavelength of 780 to 2100 nm of the first resin layer is higher than the infrared ray transmittance in the wavelength of 780 to 2100 nm of the second resin layer.

In yet another specific aspect of the laminated glass according to the present invention, the infrared ray transmittance in the wavelength of 780 to 2100 nm of the first laminated glass member is higher than the infrared ray transmittance in the wavelength of 780 to 2100 nm of the second laminated glass member.

In yet another specific aspect of the laminated glass according to the present invention, the infrared ray transmittance in the wavelength of 780 to 2100 nm of the first resin layer is higher than the infrared ray transmittance in the wavelength of 780 to 2100 nm of the second resin layer, and the infrared ray transmittance in the wavelength of 780 to 2100 nm of the first laminated glass member is higher than the infrared ray transmittance in the wavelength of 780 to 2100 nm of the second laminated glass member.

In a different specific aspect of the laminated glass according to the present invention, the infrared ray reflection layer is a resin film with metal foil, a multilayer laminated film in which a metal layer and a dielectric layer are formed on a resin layer, a multilayer resin film or a liquid crystal film.

In another specific aspect of the laminated glass according to the present invention, the second resin layer contains metal oxide particles.

In yet another specific aspect of the laminated glass according to the present invention, the metal oxide particles are tin-doped indium oxide particles or tungsten oxide particles.

In a different specific aspect of the laminated glass according to the present invention, the second resin layer contains at least one kind among a phthalocyanine compound, a naphthalocyanine compound and an anthracyanine compound.

In a different specific aspect of the laminated glass according to the present invention, the thermoplastic resin in the first resin layer is a polyvinyl acetal resin and the thermoplastic resin in the second resin layer is a polyvinyl acetal resin.

In a further different specific aspect of the laminated glass according to the present invention, the first resin layer contains a plasticizer and the second resin layer contains a plasticizer.

In another specific aspect of the laminated glass according to the present invention, the first resin layer contains an ultraviolet ray shielding agent.

In yet another specific aspect of the laminated glass according to the present invention, the second resin layer contains an ultraviolet ray shielding agent.

According to a broad aspect of the present invention, there is provided a method of mounting the above-described laminated glass for a building or a vehicle on an opening part between an outer space and an inner space into which heat rays are made incident from the outer space, including the step of mounting the laminated glass on the opening part so that the first laminated glass member is positioned at the outer space side and the second laminated glass member is positioned at the inner space side.

Effect of the Invention

With regard to the laminated glass according to the present invention, since the first laminated glass member, the first resin layer, the infrared ray reflection layer, the second resin layer and the second laminated glass member are arranged side by side in this order and the infrared ray transmittance in the wavelength of 780 to 2100 nm of the whole layer composed of the first laminated glass member and the first resin layer is higher than the infrared ray transmittance in the wavelength of 780 to 2100 nm of the whole layer composed of the second laminated glass member and the second resin layer, it is possible to enhance the heat shielding properties.

MODE(S) FOR CARRYING OUT THE INVENTION

Hereinafter, the present invention will be elucidated by describing specific embodiments and examples of the present invention with reference to the drawings.

Figure 2:
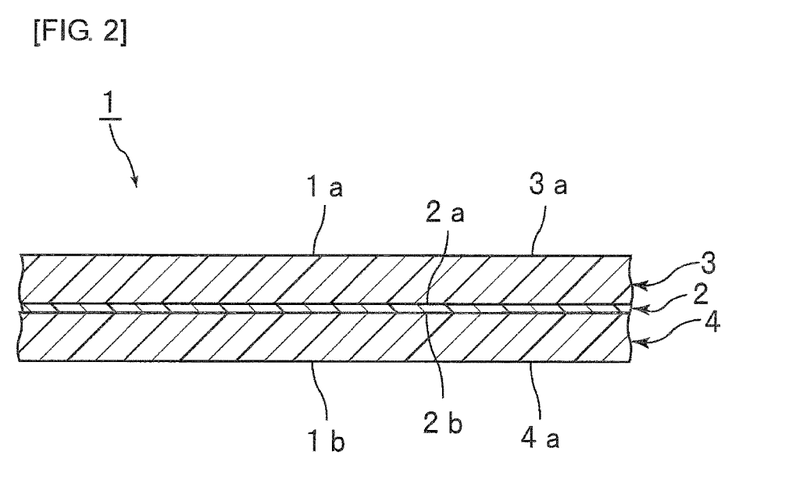
FIG. 2 is a partially cutout cross-sectional view showing an interlayer film for laminated glass used for laminated glass in accordance with one embodiment of the present invention.

FIG. 2 shows an interlayer film for laminated glass used for laminated glass in accordance with one embodiment of the present invention schematically represented as a cross-sectional view.

An interlayer film 1 shown in FIG. 2 is a multilayer interlayer film. The interlayer film 1 is used for obtaining laminated glass. The interlayer film 1 is an interlayer film for laminated glass. The interlayer film 1 is provided with an infrared ray reflection layer 2, a first resin layer 3 arranged on a first surface 2a side of the infrared ray reflection layer 2, and a second resin layer 4 arranged on a second surface 2b side opposite to the first surface 2a of the infrared ray reflection layer 2. The first resin layer 3 is layered on the first surface 2a of the infrared ray reflection layer 2. The second resin layer 4 is layered on the second surface 2b of the infrared ray reflection layer 2. The infrared ray reflection layer 2 is an intermediate layer and has heat ray reflecting performance. The first and second resin layers 3 and 4 are surface layers in the present embodiment. The infrared ray reflection layer 2 is arranged between the first and second resin layers 3 and 4. The infrared ray reflection layer 2 is sandwiched between the first and second resin layers 3 and 4. Accordingly, the interlayer film 1 has a multilayer structure in which the first resin layer 3, the infrared ray reflection layer 2, and the second resin layer 4 are layered in this order.

In this connection, other layers may be arranged between the infrared ray reflection layer 2 and the first resin layer 3 and between the infrared ray reflection layer 2 and the second resin layer 4, respectively. It is preferred that the first resin layer 3 and the second resin layer 4 each be directly layered on the infrared ray reflection layer 2. Examples of other layers include a layer containing a thermoplastic resin such as a polyvinyl acetal resin and a layer containing polyethylene terephthalate and the like.

The infrared ray reflection layer reflects infrared rays. The infrared ray reflection layer is not particularly limited as long as the layer has infrared ray reflecting performance. Examples of the infrared ray reflection layer include a resin film with metal foil, a multilayer laminated film in which a metal layer and a dielectric layer are formed on a resin layer, a film containing graphite, a multilayer resin film, a liquid crystal film, and the like. These films have infrared ray reflecting performance.

It is especially preferred that the infrared ray reflection layer be a resin film with metal foil, a multilayer laminated film in which a metal layer and a dielectric layer are formed on a resin layer, a multilayer resin film or a liquid crystal film. These films are highly excellent in infrared ray reflecting performance. Accordingly, by the use of these films, it is possible to obtain laminated glass in which the heat shielding properties are further enhanced and high visible light transmittance can be maintained over a longer period of time. The infrared ray reflection layer may be a resin film with metal foil, a multilayer resin film or a liquid crystal film.

The resin film with metal foil is provided with a resin film and metal foil layered on the outer surface of the resin film. Examples of the material for the resin film include a polyethylene terephthalate resin, a polyvinyl acetal resin, an ethylene-vinyl acetate copolymer resin, an ethylene-acryl copolymer resin, a polyurethane resin, a polyvinyl alcohol resin, a polyolefin resin, a polyvinyl chloride resin, a polyimide resin and the like. Examples of the material for the metal foil include aluminum, copper, silver, gold, palladium, an alloy containing these metals, and the like.

The multilayer laminated film in which a metal layer and a dielectric layer are formed on a resin layer is a multilayer laminated film in which metal layers and dielectric layers are alternately layered in an arbitrary number of layers on a resin layer (resin film).

Examples of the material for the resin layer (resin film) in the multilayer laminated film include the same material as the material for the resin film in the resin film with metal foil. Examples of the material for the resin layer (resin film) in the multilayer laminated film include polyethylene, polypropylene, polylactic acid, poly(4-methylpentene-1), polyvinylidene fluoride, cyclic polyolefin, polymethyl methacrylate, polyvinyl chloride, polyvinyl alcohol, a polyamide such as nylon 6, 11, 12 and 66, polystyrene, polycarbonate, polyester, polyphenylene sulfide, polyetherimide and the like. Examples of the material for the metal layer in the multilayer laminated film include the same material as the material for the metal foil in the resin film with metal foil. On both sides or one side of the metal layer, a coat layer of a metal or a mixed oxide may be provided. Examples of the material for the coat layer include $ZnO$, $Al_2O_3$, $Ga_2O_3$, $InO_3$, $MgO$, Ti, NiCr, Cu and the like.

Examples of the material for the dielectric layer in the multilayer laminated film include indium oxide and the like.

The multilayer resin film is a laminated film in which a plurality of resin films are layered. Examples of the material for the multilayer resin film include the same material as the material for the resin layer (resin film) in the multilayer laminated film. The number of laminations of resin films in the multilayer resin film is 2 or more, may be 3 or more and may be 5 or more. The number of laminations of resin films in the multilayer resin film may be 1000 or less, may be 100 or less and may be 50 or less.

The multilayer resin film may be a multilayer resin film in which two or more kinds of thermoplastic resin layers having a different optical property (refractive index) are alternately or randomly layered in an arbitrary number of layers. Such a multilayer resin film is constituted so that desired infrared ray reflecting performance is attained.

Examples of the liquid crystal film include a film prepared by layering cholesteric liquid crystal layers which reflect light with an arbitrary wavelength in an arbitrary number of layers. Such a liquid crystal film is constituted so that desired infrared ray reflecting performance is attained.

It is preferred that the infrared ray transmittance in the wavelength of 780 to 2100 nm of the first resin layer be higher than the infrared ray transmittance in the wavelength of 780 to 2100 nm of the second resin layer. In this case, considering from a different point of view, the infrared ray absorptance of the first resin layer is lower than the infrared ray absorptance of the second resin layer.

In the case where the infrared ray transmittance of the first resin layer is higher than the infrared ray transmittance of the second resin layer, the first resin layer transmits a relatively large quantity of infrared rays. As such, most of the infrared rays transmitted through the first resin layer reach the infrared ray reflection layer. Since the infrared ray reflection layer reflects infrared rays, infrared rays which have reached the infrared ray reflection layer are reflected by the infrared ray reflection layer. Moreover, because the infrared ray transmittance of the first resin layer is high, most of the infrared rays reflected by the infrared ray reflection layer are transmitted through the first resin layer. As a result, a rise in the temperature of an interlayer film at the time when infrared rays are made incident into the interlayer film can be suppressed. As such, the heat shielding properties of the interlayer film are enhanced, and furthermore, high visible light transmittance can be maintained over a long period of time since the film is excellent in light resistance. Moreover, by mounting laminated glass prepared with the interlayer film on an opening part of a building or a vehicle, a rise in the temperature of an inner space of a building or a vehicle can be effectively suppressed.

On the other hand, in the case where the infrared ray transmittance of the first resin layer is higher than the infrared ray transmittance of the second resin layer, if the first resin layer and the infrared ray reflection layer transmit a part of infrared rays at all, the transmitted infrared rays reach the second resin layer. When the infrared ray transmittance of the second resin layer is low, the second resin layer effectively cuts off the transmission of infrared rays. As such, the quantity of heat rays passing through the whole interlayer film can be reduced. This also enables the heat shielding properties of the interlayer film for laminated glass to be enhanced, and by mounting laminated glass prepared with the interlayer film for laminated glass on an opening part of a building or a vehicle, a rise in the temperature of an inner space of a building or a vehicle can be effectively suppressed.

The first resin layer and the second resin layer may be the same as or different from each other. It is preferred that the first resin layer and the second resin layer be different from each other. In the case where the infrared ray transmittance in the wavelength of 780 to 2100 nm of the first resin layer is higher than the infrared ray transmittance in the wavelength of 780 to 2100 nm of the second resin layer, the first resin layer and the second resin layer are different from each other in composition.

The first resin layer contains a thermoplastic resin. It is more preferred that the thermoplastic resin in the first resin layer be a polyvinyl acetal resin. It is preferred that the first resin layer contain a plasticizer, and it is more preferred that the layer contain a polyvinyl acetal resin and a plasticizer. It is preferred that the first resin layer contain an ultraviolet ray shielding agent, and it is preferred that the layer contain an oxidation inhibitor.

The second resin layer contains a thermoplastic resin. It is more preferred that the thermoplastic resin in the second resin layer be a polyvinyl acetal resin. It is preferred that the second resin layer contain a plasticizer, and it is more preferred that the layer contain a polyvinyl acetal resin and a plasticizer. It is preferred that the second resin layer contain an ultraviolet ray shielding agent, and it is preferred that the layer contain an oxidation inhibitor.

It is preferred that the second resin layer contain a heat shielding compound. By allowing a heat shielding compound to be contained in the second resin layer, the infrared ray transmittance of the first resin layer becomes higher than the infrared ray transmittance of the second resin layer. As a result, it is easy to make the infrared ray transmittance of the whole layer composed of the first laminated glass member and the first resin layer higher than the infrared ray transmittance of the whole layer composed of the second laminated glass member and the second resin layer.

The first resin layer may contain a heat shielding compound. Moreover, when the content (% by weight) of the heat shielding compound in the first resin layer is smaller than the content (% by weight) of the heat shielding compound in the second resin layer, it is easy to make the infrared ray transmittance of the first resin layer higher than the infrared ray transmittance of the second resin layer. Examples of the heat shielding compound include heat shielding particles such as metal oxide particles, at least one kind of ingredient among a phthalocyanine compound, a naphthalocyanine compound and an anthracyanine compound (hereinafter, sometimes referred to as Ingredient X), and the like. In this connection, the heat shielding compound means a compound capable of absorbing infrared rays. In the case where the first resin layer or the second resin layer contains a plurality of heat shielding compounds, the total content (% by weight) of the heat shielding compound in the first resin layer is preferably smaller than the total content (% by weight) of the heat shielding compound in the second resin layer, more preferably smaller by 0.05% by weight or more, further preferably smaller by 0.1% by weight or more, especially preferably smaller by 0.2% by weight or more, and most preferably smaller by 0.4% by weight or more. Furthermore, because the heat shielding properties are further enhanced, it is preferred that the difference between the total content (% by weight) of the heat shielding compound in the second resin layer and the total content (% by weight) of the heat shielding compound in the first resin layer be 2% by weight or less.

Hereinafter, the details of materials constituting the first and second resin layers will be described.

(Thermoplastic Resin)

The first and second resin layers contain a thermoplastic resin. The thermoplastic resin is not particularly limited. As the thermoplastic resin, a conventionally known thermoplastic resin can be used. The thermoplastic resins may be used alone and may be used in combination of two or more thereof. The thermoplastic resin in the first resin layer and the thermoplastic resin in the second resin layer may be the same as or different from each other.

Examples of the thermoplastic resin include a polyvinyl acetal resin, an ethylene-vinyl acetate copolymer resin, an ethylene-acrylic copolymer resin, a polyurethane resin, a polyvinyl alcohol resin and the like. Thermoplastic resins other than these may be used.

It is preferred that the thermoplastic resin be a polyvinyl acetal resin. By using a polyvinyl acetal resin and a plasticizer together, the adhesive force of the first and second resin layers to a laminated glass member and another layer such as an infrared ray reflection layer is further enhanced.

For example, the polyvinyl acetal resin can be produced by acetalizing polyvinyl alcohol with aldehyde. For example, the polyvinyl alcohol can be produced by saponifying polyvinyl acetate. The saponification degree of the polyvinyl alcohol generally lies within the range of 70 to 99.8% by mole.

The average polymerization degree of the polyvinyl alcohol is preferably 200 or more, more preferably 500 or more, preferably 5000 or less, more preferably 4000 or less, further preferably 3500 or less, especially preferably 3000 or less, and most preferably 2500 or less. When the average polymerization degree is not less than the above lower limit, the penetration resistance of the laminated glass is further enhanced. When the average polymerization degree is not more than the above upper limit, molding of the interlayer film is facilitated. In this connection, the average polymerization degree of the polyvinyl alcohol is determined by a method in accordance with JIS K6726 "Testing methods for polyvinyl alcohol".

The number of carbon atoms of the acetal group contained in the polyvinyl acetal resin is not particularly limited. The aldehyde used when the polyvinyl acetal resin is produced is not particularly limited. It is preferred that the number of carbon atoms of the acetal group in the polyvinyl acetal resin be 3 or 4. When the number of carbon atoms of the acetal group in the polyvinyl acetal resin is 3 or more, the glass transition temperature of the interlayer film is sufficiently lowered.

The aldehyde is not particularly limited. In general, an aldehyde with 1 to 10 carbon atoms is suitably used. Examples of the aldehyde with 1 to 10 carbon atoms include propionaldehyde, n-butyraldehyde, isobutyraldehyde, n-valeraldehyde, 2-ethylbutyraldehyde, n-hexyl aldehyde, n-octyl aldehyde, n-nonyl aldehyde, n-decyl aldehyde, formaldehyde, acetaldehyde, benzaldehyde and the like. Of these, preferred is propionaldehyde, n-butyraldehyde, isobutyraldehyde, n-hexyl aldehyde or n-valeraldehyde, more preferred is propionaldehyde, n-butyraldehyde or isobutyraldehyde, and further preferred is n-butyraldehyde. The aldehydes may be used alone and may be used in combination of two or more thereof.

The content ratio of the hydroxyl group (the amount of hydroxyl groups) of the polyvinyl acetal resin is preferably 15% by mole or more, more preferably 18% by mole or more, further preferably 20% by mole or more, especially preferably 28% by mole or more, preferably 40% by mole or less, more preferably 35% by mole or less, and further preferably 32% by mole or less. When the content ratio of the hydroxyl group is not less than the above lower limit, the adhesive force of the interlayer film is further enhanced. Moreover, when the content ratio of the hydroxyl group is not more than the above upper limit, the flexibility of the interlayer film is enhanced and the handling of the interlayer film is facilitated.

The content ratio of the hydroxyl group of the polyvinyl acetal resin is a value expressing the mole fraction determined by dividing the amount of ethylene groups to which the hydroxyl group is bonded by the total amount of ethylene groups in the main chain in terms of percentage. For example, the amount of ethylene groups to which the hydroxyl group is bonded can be measured in accordance with JIS K6726 "Testing methods for polyvinyl alcohol" to be determined.

The acetylation degree (the amount of acetyl groups) of the polyvinyl acetal resin is preferably 0.1% by mole or more, more preferably 0.3% by mole or more, further preferably 0.5% by mole or more, preferably 30% by mole or less, more preferably 25% by mole or less, further preferably 20% by mole or less, especially preferably 15% by mole or less, and most preferably 3% by mole or less. When the acetylation degree is not less than the above lower limit, the compatibility between the polyvinyl acetal resin and a plasticizer is enhanced. When the acetylation degree is not more than the above upper limit, the moisture resistance of the interlayer film and laminated glass is enhanced.

The acetylation degree is a value expressing the mole fraction determined by dividing a value obtained by subtracting the amount of ethylene groups to which the acetal group is bonded and the amount of ethylene groups to which the hydroxyl group is bonded from the total amount of ethylene groups in the main chain by the total amount of ethylene groups in the main chain in terms of percentage. For example, the amount of ethylene groups to which the acetal group is bonded can be measured in accordance with JIS K6728 "Testing methods for polyvinyl butyral".

The acetalization degree of the polyvinyl acetal resin (the butyralization degree in the case of a polyvinyl butyral resin) is preferably 60% by mole or more, more preferably 63% by mole or more, preferably 85% by mole or less, more preferably 75% by mole or less, and further preferably 70% by mole or less. When the acetalization degree is not less than the above lower limit, the compatibility between the polyvinyl acetal resin and a plasticizer is enhanced. When the acetalization degree is not more than the above upper limit, the reaction time required for producing the polyvinyl acetal resin is shortened.

The acetalization degree is a value expressing the mole fraction determined by dividing the amount of ethylene groups to which the acetal group is bonded by the total amount of ethylene groups in the main chain in terms of percentage.

The acetalization degree can be calculated by a method in accordance with JIS K6728 "Testing methods for polyvinyl butyral".

In this connection, it is preferred that the content ratio of the hydroxyl group (the amount of hydroxyl groups), the acetalization degree (the butyralization degree) and the acetylation degree be calculated from the results measured by a method in accordance with JIS K6728 "Testing methods for polyvinyl butyral". In the case where the polyvinyl acetal resin is a polyvinyl butyral resin, it is preferred that the content ratio of the hydroxyl group (the amount of hydroxyl groups), the acetalization degree (the butyralization degree) and the acetylation degree be calculated from the results measured by a method in accordance with JIS K6728 "Testing methods for polyvinyl butyral".

(Plasticizer)

From the viewpoint of further enhancing the adhesive force of the interlayer film, it is preferred that the first resin layer contain a plasticizer and it is preferred that the second resin layer contain a plasticizer. In the case where the thermoplastic resin in the first and second resin layers is a polyvinyl acetal resin, it is especially preferred that the first and second resin layers each contain a plasticizer.

The plasticizer is not particularly limited. As the plasticizer, a conventionally known plasticizer can be used. The plasticizers may be used alone and may be used in combination of two or more thereof.

Examples of the plasticizer include organic ester plasticizers such as a monobasic organic acid ester and a polybasic organic acid ester, phosphate plasticizers such as an organic phosphate plasticizer and an organic phosphite plasticizer, and the like. Of these, organic ester plasticizers are preferred. It is preferred that the plasticizer be a liquid plasticizer.

The monobasic organic acid ester is not particularly limited and examples thereof include a glycol ester obtained by the reaction of a glycol with a monobasic organic acid, an ester of triethylene glycol or tripropylene glycol and a monobasic organic acid, and the like. Examples of the glycol include triethylene glycol, tetraethylene glycol, tripropylene glycol and the like. Examples of the monobasic organic acid include butyric acid, isobutyric acid, caproic acid, 2-ethylbutyric acid, heptanoic acid, n-octylic acid, 2-ethylhexanoic acid, n-nonylic acid, decanoic acid and the like.

The polybasic organic acid ester is not particularly limited and examples thereof include an ester compound of a polybasic organic acid and an alcohol having a linear or branched structure of 4 to 8 carbon atoms. Examples of the polybasic organic acid include adipic acid, sebacic acid, azelaic acid and the like.

The organic ester plasticizer is not particularly limited and examples thereof include triethylene glycol di-2-ethylbutyrate, triethylene glycol di-2-ethylhexanoate, triethylene glycol dicaprylate, triethylene glycol di-n-octanoate, triethylene glycol di-n-heptanoate, tetraethylene glycol di-n-heptanoate, dibutyl sebacate, dioctyl azelate, dibutyl carbitol adipate, ethylene glycol di-2-ethylbutyrate, 1,3-propylene glycol di-2-ethylbutyrate, 1,4-butylene glycol di-2-ethylbutyrate, diethylene glycol di-2-ethylbutyrate, diethylene glycol di-2-ethylhexanoate, dipropylene glycol di-2-ethylbutyrate, triethylene glycol di-2-ethylpentanoate, tetraethylene glycol di-2-ethylbutyrate, diethylene glycol dicaprylate, dihexyl adipate, dioctyl adipate, hexyl cyclohexyl adipate, a mixture of heptyl adipate and nonyl adipate, diisononyl adipate, diisodecyl adipate, heptyl nonyl adipate, dibutyl sebacate, oil-modified sebacic alkyds, a mixture of a phosphoric acid ester and an adipic acid ester, and the like. Organic ester plasticizers other than these may be used.

The organic phosphate plasticizer is not particularly limited and examples thereof include tributoxyethyl phosphate, isodecyl phenyl phosphate, triisopropyl phosphate, and the like.

It is preferred that the plasticizer be a diester plasticizer represented by the following formula (1).

[Chemical 1]

Formula (1)

In the foregoing formula (1), R1 and R2 each represent an organic group with 2 to 10 carbon atoms, R3 represents an ethylene group, an isopropylene group or an n-propylene group, and p represents an integer of 3 to 10. It is preferred that R1 and R2 in the foregoing formula (1) each be an organic group with 5 to 10 carbon atoms, and it is more preferred that R1 and R2 each be an organic group with 6 to 10 carbon atoms.

It is preferred that the plasticizer include at least one kind among triethylene glycol di-2-ethylhexanoate (3GO) and triethylene glycol di-2-ethylbutyrate (3GH), and it is more preferred that the plasticizer include triethylene glycol di-2-ethylhexanoate.

The content of the plasticizer is not particularly limited. In each of the first and second resin layers, relative to 100 parts by weight of the thermoplastic resin, the content of the plasticizer is preferably 25 parts by weight or more, more preferably 30 parts by weight or more, further preferably 35 parts by weight or more, preferably 75 parts by weight or less, more preferably 60 parts by weight or less, further preferably 50 parts by weight or less, and especially preferably 40 parts by weight or less. When the content of the plasticizer is not less than the above lower limit, the penetration resistance of the laminated glass is further enhanced. When the content of the plasticizer is not more than the above upper limit, the transparency of the interlayer film is further enhanced.

(Heat Shielding Compound)

Ingredient X:

It is preferred that the second resin layer contain a heat shielding compound. It is preferred that the second resin layer contain at least one kind of Ingredient X among a phthalocyanine compound, a naphthalocyanine compound and an anthracyanine compound. It is preferred that the second resin layer contain at least one kind of Ingredient X among a phthalocyanine compound, a naphthalocyanine compound and an anthracyanine compound or contain heat shielding particles described below. The first resin layer may contain the Ingredient X. The Ingredient X is a heat shielding compound. In the whole interlayer film, by using the Ingredient X contained in at least one layer, infrared rays (heat rays) can be effectively cut off. By allowing the Ingredient X to be contained in the second resin layer, infrared rays can be further effectively cut off.

The Ingredient X is not particularly limited. As the Ingredient X, a conventionally known phthalocyanine compound, naphthalocyanine compound and anthracyanine compound can be used. The Ingredients X may be used alone and may be used in combination of two or more thereof.

Examples of the Ingredient X include phthalocyanine, a derivative of phthalocyanine, naphthalocyanine, a derivative of naphthalocyanine, anthracyanine, a derivative of anthracyanine, and the like. It is preferred that the phthalocyanine compound and the derivative of phthalocyanine each have a phthalocyanine skeleton. It is preferred that the naphthalocyanine compound and the derivative of naphthalocyanine each have a naphthalocyanine skeleton. It is preferred that the anthracyanine compound and the derivative of anthracyanine each have an anthracyanine skeleton.

From the viewpoint of further enhancing the heat shielding properties of the interlayer film and laminated glass, it is preferred that the Ingredient X be at least one kind selected from the group consisting of phthalocyanine, a derivative of phthalocyanine, naphthalocyanine and a derivative of naphthalocyanine, and it is more preferred that the Ingredient X be at least one kind among phthalocyanine and a derivative of phthalocyanine.

From the viewpoints of effectively enhancing the heat shielding properties and maintaining the visible light transmittance at a higher level over a long period of time, it is preferred that the Ingredient X contain a vanadium atom or a copper atom. It is preferred that the Ingredient X contain a vanadium atom and it is also preferred that the Ingredient X contain a copper atom. It is more preferred that the Ingredient X be at least one kind among phthalocyanine containing a vanadium atom or a copper atom and a derivative of phthalocyanine containing a vanadium atom or a copper atom. From the viewpoint of still further enhancing the heat shielding properties of the interlayer film and laminated glass, it is preferred that the Ingredient X have a structural unit in which an oxygen atom is bonded to a vanadium atom.

In the case where the first resin layer or the second resin layer contains the Ingredient X, in 100% by weight of each of the first and second resin layers, the content of the Ingredient X is preferably 0.001% by weight or more, more preferably 0.005% by weight or more, further preferably 0.01% by weight or more, especially preferably 0.02% by weight or more, preferably 0.2% by weight or less, more preferably 0.1% by weight or less, further preferably 0.05% by weight or less, and especially preferably 0.04% by weight or less. When the content of the Ingredient X in the first and second resin layers is not less than the above lower limit and not more than the above upper limit, the heat shielding properties are sufficiently enhanced and the visible light transmittance is sufficiently enhanced. For example, it is possible to allow the visible light transmittance to be 70% or more.

Heat Shielding Particles:

It is preferred that the second resin layer contain heat shielding particles. The first resin layer may contain heat shielding particles. The heat shielding particle is a heat shielding compound. In the whole interlayer film, by using the heat shielding compound for at least one layer, infrared rays (heat rays) can be effectively cut off. By allowing heat shielding particles to be contained in the second resin layer, infrared rays can be further effectively cut off.

From the viewpoint of further enhancing the heat shielding properties of laminated glass, it is more preferred that the heat shielding particles be metal oxide particles. It is preferred that the heat shielding particle be a particle (a metal oxide particle) formed from an oxide of a metal. The heat shielding particles may be used alone and may be used in combination of two or more thereof.

The energy amount of an infrared ray with a wavelength of 780 nm or more which is longer than that of visible light is small compared to an ultraviolet ray. However, the thermal action of infrared rays is large, and when infrared rays are once absorbed into a substance, heat is released from the substance. As such, infrared rays are generally called heat rays. By the use of the heat shielding particles, infrared rays (heat rays) can be effectively cut off. In this connection, the heat shielding particle means a particle capable of absorbing infrared rays.

Specific examples of the heat shielding particles include metal oxide particles such as aluminum-doped tin oxide particles, indium-doped tin oxide particles, antimony-doped tin oxide particles (ATO particles), gallium-doped zinc oxide particles (GZO particles), indium-doped zinc oxide particles (IZO particles), aluminum-doped zinc oxide particles (AZO particles), niobium-doped titanium oxide particles, sodium-doped tungsten oxide particles, cesium-doped tungsten oxide particles, thallium-doped tungsten oxide particles, rubidium-doped tungsten oxide particles, tin-doped indium oxide particles (ITO particles), tin-doped zinc oxide particles and silicon-doped zinc oxide particles, lanthanum hexaboride ($LaB_6$) particles, and the like. Heat shielding particles other than these may be used. Of these, since the heat ray shielding function is high, preferred are metal oxide particles, more preferred are ATO particles, GZO particles, IZO particles, ITO particles or tungsten oxide particles, and especially preferred are ITO particles or tungsten oxide particles. In particular, since the heat ray shielding function is high and the particles are readily available, preferred are tin-doped indium oxide particles (ITO particles), and also preferred are tungsten oxide particles.

The tungsten oxide particles are generally represented by the following formula (X1) or the following formula (X2). In the interlayer film, the tungsten oxide particles represented by the following formula (X1) or the following formula (X2) are suitably used.

$$W_yO_z \qquad \text{formula (X1)}$$

In the foregoing formula (X1), W represents tungsten, O represents oxygen, and y and z satisfy the equation of $2.0 < z/y < 3.0$.

$$M_xW_yO_z \qquad \text{formula (X2)}$$

In the foregoing formula (X2), M represents at least one kind of element selected from the group consisting of H, He, an alkali metal, an alkaline earth metal, a rare earth element, Mg, Zr, Cr, Mn, Fe, Ru, Co, Rh, Ir, Ni, Pd, Pt, Cu, Ag, Au, Zn, Cd, Al, Ga, In, Tl, Si, Ge, Sn, Pb, Sb, B, F, P, S, Se, Br, Te, Ti, Nb, V, Mo, Ta and Re, W represents tungsten, O represents oxygen, and x, y and z satisfy the equations of $0.001 \leq x/y \leq 1$, and $2.0 < z/y \leq 3.0$.

From the viewpoint of further enhancing the heat shielding properties of the interlayer film and laminated glass, it is preferred that the tungsten oxide particles be metal-doped tungsten oxide particles. Examples of the "tungsten oxide particles" include metal-doped tungsten oxide particles. Specifically, examples of the metal-doped tungsten oxide particles include sodium-doped tungsten oxide particles, cesium-doped tungsten oxide particles, thallium-doped tungsten oxide particles, rubidium-doped tungsten oxide particles, and the like.

From the viewpoint of further enhancing the heat shielding properties of the interlayer film and laminated glass, cesium-doped tungsten oxide particles are especially preferred. From the viewpoint of still further enhancing the heat shielding properties of the interlayer film and laminated glass, it is preferred that the cesium-doped tungsten oxide particles be tungsten oxide particles represented by the formula: $Cs_{0.33}WO_3$.

The average particle diameter of the heat shielding particles is preferably 0.01 μm or more, more preferably 0.02 μm or more, preferably 0.1 μm or less, and more preferably 0.05 μm or less. When the average particle diameter is not less than the above lower limit, the heat ray shielding properties are sufficiently enhanced. When the average particle diameter is not more than the above upper limit, the dispersibility of heat shielding particles is enhanced.

The "average particle diameter" refers to the volume average particle diameter. The average particle diameter can be measured using a particle size distribution measuring apparatus ("UPA-EX150" available from NIKKISO CO., LTD.), or the like.

In the case where the first resin layer or the second resin layer contains the heat shielding particles, in 100% by weight of each of the first and second resin layers, the content of the heat shielding particles is preferably 0.01% by weight or more, more preferably 0.1% by weight or more, further preferably 1% by weight or more, especially preferably 1.5% by weight or more, preferably 6% by weight or less, more preferably 5.5% by weight or less, further preferably 4% by weight or less, especially preferably 3.5% by weight or less, and most preferably 3.0% by weight or less. When the content of the heat shielding particles is not less than the above lower limit and not more than the above upper limit, the heat shielding properties are sufficiently enhanced and the visible light transmittance is sufficiently enhanced.

In the case where the first resin layer or the second resin layer contains the heat shielding particles, it is preferred that each of the first and second resin layers contain the heat shielding particles in a proportion of 0.1 to 12 $g/m^2$. In the case where the proportion of the heat shielding particles lies within the above-mentioned range, the heat shielding properties are sufficiently enhanced and the visible light transmittance is sufficiently enhanced. The proportion of the heat shielding particles is preferably 0.5 $g/m^2$ or more, more preferably 0.8 $g/m^2$ or more, further preferably 1.5 $g/m^2$ or more, especially preferably 3 $g/m^2$ or more, preferably 11 $g/m^2$ or less, more preferably 10 $g/m^2$ or less, further preferably 9 $g/m^2$ or less, and especially preferably 7 $g/m^2$ or less. When the proportion is not less than the above lower limit, the heat shielding properties are further enhanced. When the proportion is not more than the above upper limit, the visible light transmittance is further enhanced.

(Ultraviolet Ray Shielding Agent)

It is preferred that the first resin layer contain an ultraviolet ray shielding agent. It is preferred that the second resin layer contain an ultraviolet ray shielding agent. It is more preferred that both of the first resin layer and the second resin layer contain an ultraviolet ray shielding agent. By the use of an ultraviolet ray shielding agent, even when the interlayer film and the laminated glass are used for a long period of time, the visible light transmittance becomes further difficult to be lowered. The ultraviolet ray shielding agents may be used alone and may be used in combination of two or more thereof.

Examples of the ultraviolet ray shielding agent include an ultraviolet ray absorber. It is preferred that the ultraviolet ray shielding agent be an ultraviolet ray absorber.

Examples of a common ultraviolet ray shielding agent which is heretofore widely known include a metal-based ultraviolet ray shielding agent, a metal oxide-based ultraviolet ray shielding agent, a benzotriazole-based ultraviolet ray shielding agent (a benzotriazole compound), a benzophenone-based ultraviolet ray shielding agent (a benzophenone compound), a triazine-based ultraviolet ray shielding agent (a triazine compound), a malonic acid ester-based ultraviolet ray shielding agent (a malonic acid ester compound), an oxalic anilide-based ultraviolet ray shielding agent (an oxalic anilide compound), a benzoate-based ultraviolet ray shielding agent (a benzoate compound), and the like.

Examples of the metal-based ultraviolet ray shielding agent include platinum particles, particles in which the surface of platinum particles is coated with silica, palladium particles, particles in which the surface of palladium particles is coated with silica, and the like. It is preferred that the ultraviolet ray shielding agent not be heat shielding particles.

Examples of the metal oxide-based ultraviolet ray shielding agent include zinc oxide, titanium oxide, cerium oxide and the like. Furthermore, in the metal oxide-based ultraviolet ray shielding agent, the surface thereof may be coated. Examples of a coating material for the surface of the metal oxide-based ultraviolet ray shielding agent include an insulating metal oxide, a hydrolyzable organosilicon compound, a silicone compound and the like.

Examples of the insulating metal oxide include silica, alumina, zirconia and the like. For example, the insulating metal oxide has a band-gap energy of 5.0 eV or more.

Examples of the benzotriazole-based ultraviolet ray shielding agent include benzotriazole-based ultraviolet ray shielding agents such as 2-(2'-hydroxy-5'-methylphenyl)benzotriazole ("Tinuvin P" available from BASF Japan Ltd.), 2-(2'-hydroxy-3',5'-di-t-butylphenyl)benzotriazole ("Tinuvin 320" available from BASF Japan Ltd.), 2-(2'-hydroxy-3'-t-butyl-5-methylphenyl)-5-chlorobenzotriazole ("Tinuvin 326" available from BASF Japan Ltd.) and 2-(2'-hydroxy-3',5'-di-amylphenyl)benzotriazole ("Tinuvin 328" available from BASF Japan Ltd.). It is preferred that the benzotriazole-based ultraviolet ray shielding agent be a benzotriazole-based ultraviolet ray shielding agent containing halogen atoms, and it is more preferred that the benzotriazole-based ultraviolet ray shielding agent be a benzotriazole-based ultraviolet ray shielding agent containing chlorine atoms, since they are excellent in ultraviolet ray absorbing performance.

Examples of the benzophenone-based ultraviolet ray shielding agent include octabenzone ("Chimassorb 81" available from BASF Japan Ltd.) and the like.

Examples of the triazine-based ultraviolet ray shielding agent include 2-(4,6-diphenyl-1,3,5-triazine-2-yl)-5-[(hexyl)oxy]-phenol ("Tinuvin 1577FF" available from BASF Japan Ltd.) and the like.

Examples of the malonic acid ester-based ultraviolet ray shielding agent include dimethyl 2-(p-methoxybenzylidene)malonate, tetraethyl-2,2-(1,4-phenylenedimethylidene)bis-malonate, 2-(p-methoxybenzylidene)-bis(1,2,2,6,6-pentamethyl-4-piperidinyl)malonate, and the like.

Examples of a commercial product of the malonic acid ester-based ultraviolet ray shielding agent include Hostavin B-CAP, Hostavin PR-25 and Hostavin PR-31 (any of these is available from Clariant Japan K.K.).

Examples of the oxalic anilide-based ultraviolet ray shielding agent include oxalic acid diamides having a substituted aryl group and the like on the nitrogen atom such as N-(2-ethylphenyl)-N'-(2-ethoxy-5-t-butylphenyl)oxalic acid diamide, N-(2-ethylphenyl)-N'-(2-ethoxy-phenyl)oxalic acid diamide and 2-ethyl-2'-ethoxy-oxanilide ("Sanduvor VSU" available from Clariant Japan K.K.).

Examples of the benzoate-based ultraviolet ray shielding agent include 2,4-di-tert-butylphenyl-3,5-di-tert-butyl-4-hydroxybenzoate ("Tinuvin 120" available from BASF Japan Ltd.) and the like.

In order to suppress the lowering in visible light transmittance of the interlayer film and laminated glass after the lapse of time, it is preferred that the ultraviolet ray shielding agent be 2-(2'-hydroxy-3'-t-butyl-5-methylphenyl)-5-chlorobenzotriazole ("Tinuvin 326" available from BASF Japan Ltd.) or 2-(2'-hydroxy-3',5'-di-amylphenyl)benzotriazole ("Tinuvin 328" available from BASF Japan Ltd.), and the ultraviolet ray shielding agent may be 2-(2'-hydroxy-3'-t-butyl-5-methylphenyl)-5-chlorobenzotriazole.

In the case where the first and second resin layers contain the ultraviolet ray shielding agent, in 100% by weight of each of the first and second resin layers, the content of the ultraviolet ray shielding agent is preferably 0.1% by weight or more, more preferably 0.2% by weight or more, further preferably 0.3% by weight or more, especially preferably 0.5% by weight or more, preferably 2.5% by weight or less, more preferably 2% by weight or less, further preferably 1% by weight or less, and especially preferably 0.8% by weight or less. When the content of the ultraviolet ray shielding agent is not less than the above lower limit and not more than the above upper limit, the lowering in visible light transmittance after the lapse of time is further suppressed. In particular, by allowing the content of the ultraviolet ray shielding agent in 100% by weight of each of the first and second resin layers to be 0.2% by weight or more, the lowering in visible light transmittance of the interlayer film and laminated glass after the lapse of time can be significantly suppressed.

(Oxidation Inhibitor)

It is preferred that the first resin layer contain an oxidation inhibitor. It is preferred that the second resin layer contain an oxidation inhibitor. It is preferred that both of the first resin layer and the second resin layer contain an oxidation inhibitor. The oxidation inhibitors may be used alone and may be used in combination of two or more thereof.

Examples of the oxidation inhibitor include a phenol-based oxidation inhibitor, a sulfur-based oxidation inhibitor, a phosphorus-based oxidation inhibitor and the like. The phenol-based oxidation inhibitor is an oxidation inhibitor having a phenol skeleton. The sulfur-based oxidation inhibitor is an oxidation inhibitor containing a sulfur atom. The phosphorus-based oxidation inhibitor is an oxidation inhibitor containing a phosphorus atom.

It is preferred that the oxidation inhibitor be a phenol-based oxidation inhibitor or a phosphorus-based oxidation inhibitor.

Examples of the phenol-based oxidation inhibitor include 2,6-di-t-butyl-p-cresol (BHT), butylated hydroxyanisole (BHA), 2,6-di-t-butyl-4-ethylphenol, stearyl-β-(3,5-di-t-butyl-4-hydroxyphenyl)propionate, 2,2'-methylenebis-(4-methyl-6-butylphenol), 2,2'-methylenebis-(4-ethyl-6-t-butylphenol), 4,4'-butylidene-bis-(3-methyl-6-t-butylphenol), 1,1,3-tris-(2-methyl-hydroxy-5-t-butylphenyl)butane, tetrakis[methylene-3-(3',5'-butyl-4-hydroxyphenyl)propionate]methane, 1,3,3-tris-(2-methyl-4-hydroxy-5-t-butylphenol)butane, 1,3,5-trimethyl-2,4,6-tris(3,5-di-t-butyl-4-hydroxybenzyl)benzene, bis(3,3'-t-butylphenol)butyric acid glycol ester, bis(3-t-butyl-4-hydroxy-5-methylbenzenepropanoic acid)ethylenebis(oxyethylene), and the like. One kind or two or more kinds among these oxidation inhibitors are suitably used.

Examples of the phosphorus-based oxidation inhibitor include tridecyl phosphite, tris(tridecyl) phosphite, triphenyl phosphite, trinonylphenyl phosphite, bis(tridecyl)pentaerithritol diphosphite, bis(decyl)pentaerithritol diphosphite, tris(2,4-di-t-butylphenyl)phosphite, bis(2,4-di-t-butyl-6-methylphenyl)ethylphosphite, tris(2,4-di-t-butylphenyl) phosphite, 2,2'-methylenebis(4,6-di-t-butyl-1-phenyloxy)(2-ethylhexyloxy)phosphorus, and the like. One kind or two or more kinds among these oxidation inhibitors are suitably used.

Examples of a commercial product of the oxidation inhibitor include "IRGANOX 245" available from BASF Japan Ltd., "IRGAFOS 168" available from BASF Japan Ltd., "IRGAFOS 38" available from BASF Japan Ltd., "Smilizer BHT" available from Sumitomo Chemical Co., Ltd., "Irganox 1010" available from Nihon Ciba-Geigy K.K., and the like.

In the case where the first and second resin layers contain the oxidation inhibitor, in 100% by weight of each of the first and second resin layers, the content of the oxidation inhibitor is preferably 0.1% by weight or more, preferably 2% by weight or less, and more preferably 1.8% by weight or less. When the content of the oxidation inhibitor is not less than the above lower limit, high visible light transmittance of the interlayer film and laminated glass is maintained over a longer period of time. When the content of the oxidation inhibitor is not more than the above upper limit, excessive addition of oxidation inhibitor is prevented, and an effect commensurate with the addition of an oxidation inhibitor becomes easy to be attained.

(Other Ingredients)

The interlayer film for laminated glass may include additives such as a light stabilizer, a flame retardant, an antistatic agent, a pigment, a dye, an adhesive strength regulating agent, a moisture-resistance improving agent, a fluorescent brightening agent and the like, as necessary. These additives may be used alone and may be used in combination of two or more thereof.

(Other Details of Interlayer Film for Laminated Glass)

The interlayer film for laminated glass is arranged between a first laminated glass member and a second laminated glass member to be used.

It is preferred that the interlayer film for laminated glass be used for obtaining laminated glass which is mounted on an opening part between an outer space (first space) and an inner space (second space) into which heat rays are made incident from the outer space for a building or a vehicle. In this case, among the first and second resin layers, it is preferred that the first resin layer be arranged so as to be positioned at the outer space side.

The thickness of the interlayer film for laminated glass is not particularly limited. From the viewpoint of the practical aspect and the viewpoint of sufficiently enhancing heat shielding properties, the thickness of the interlayer film is preferably 0.1 mm or more, more preferably 0.25 mm or more, preferably 3 mm or less, and more preferably 1.5 mm or less. When the thickness of the interlayer film is not less than the above lower limit, the penetration resistance of the laminated glass is enhanced.

The thickness of the infrared ray reflection layer is preferably 0.01 mm or more, more preferably 0.04 mm or more, further preferably 0.07 mm or more, preferably 0.3 mm or less, more preferably 0.2 mm or less, further preferably 0.18 mm or less, and especially preferably 0.16 mm or less. When the thickness of the infrared ray reflection layer is not less than the above lower limit, the heat shielding properties of the laminated glass is further enhanced. When the thickness of the infrared ray reflection layer is not more than the above upper limit, the transparency of the laminated glass is further enhanced.

The thickness of each of the first and second resin layers is preferably 0.1 mm or more, more preferably 0.2 mm or more, further preferably 0.25 mm or more, especially preferably 0.3 mm or more, preferably 1.0 mm or less, more preferably 0.6 mm or less, still more preferably 0.5 mm or less, further preferably 0.45 mm or less, and especially preferably 0.4 mm or less. When the thickness of each of the first and second resin layers is not less than the above lower limit, the penetration resistance of the laminated glass is further enhanced. When the thickness of each of the first and second resin layers is not more than the above upper limit, the transparency of the laminated glass is further enhanced.

The production method of the interlayer film is not particularly limited. As the production method of the interlayer film, a conventionally known method can be used. Examples thereof include a production method of kneading the above-described respective ingredients and molding an interlayer film, and the like. A production method of extrusion-molding is preferred because the method is suitable for continuous production. In particular, it is preferred that the first and second resin layers be formed by extrusion molding.

The method for kneading is not particularly limited. Examples of this method include a method using an extruder, a plastograph, a kneader, a banbury mixer, a calender roll or the like. Of these, a method using an extruder is preferred and a method using a twin screw extruder is more preferred because the methods are suitable for continuous production. In this connection, at the time of obtaining the interlayer film for laminated glass, a first resin layer, an infrared ray reflection layer and a second resin layer are separately prepared, after which the first resin layer, the infrared ray reflection layer and the second resin layer may be layered to obtain an interlayer film, and a first resin layer, an infrared ray reflection layer and a second resin layer may be layered by coextrusion to obtain an interlayer film.

Moreover, by coating compositions for forming first and second resin layers on the surfaces of the infrared ray reflection layer, the first and second resin layers may be formed to obtain an interlayer film.

It is preferred that the first resin layer and the second resin layer contain the same polyvinyl acetal resin as each other, it is more preferred that the layers contain the same polyvinyl acetal resin as each other and the same plasticizer as each other, and it is further preferred that the layers be formed from the same resin composition as each other, since the interlayer films are excellent in production efficiency. On the other hand, from the viewpoint of further enhancing heat shielding properties, it is preferred that the first resin layer and the second resin layer be formed from different resin compositions from each other.

(Laminated Glass)

The laminated glass according to the present invention is provided with a first laminated glass member, a second laminated glass member and an interlayer film arranged between the first and second laminated glass members. The interlayer film is the above-described interlayer film for laminated glass. The first laminated glass member is arranged on the outside of the first resin layer in the interlayer film. The second laminated glass member is arranged on the outside of the second resin layer in the interlayer film. The infrared ray transmittance in the wavelength of 780 to 2100 nm of the whole layer composed of the first laminated glass member and the first resin layer is higher than the infrared ray transmittance in the wavelength of 780 to 2100 nm of the whole layer composed of the second laminated glass member and the second resin layer.

The infrared ray transmittance of the whole layer composed of the first laminated glass member and the first resin layer is the infrared ray transmittance of a laminate composed of two layers of the first laminated glass member and the first resin layer. The infrared ray transmittance of the whole layer composed of the second laminated glass member and the second resin layer is the infrared ray transmittance of a laminate composed of two layers of the second laminated glass member and the second resin layer.

Laminated glass using an interlayer film has hitherto been sometimes low in heat shielding properties and sometimes high in Tts (Total solar energy transmitted through a glazing). Furthermore, with regard to the conventional laminated glass, there is a problem that achieving both low Tts and high visible light transmittance (Visible Transmittance) at the same time is difficult.

In contrast, as described above, in the case where laminated glass is provided with an interlayer film arranged between first and second laminated glass members, the interlayer film is provided with the infrared ray reflection layer and the first and second resin layers, and the infrared ray transmittance in the wavelength of 780 to 2100 nm of the whole layer composed of the first laminated glass member and the first resin layer is higher than the infrared ray transmittance in the wavelength of 780 to 2100 nm of the whole layer composed of the second laminated glass member and the second resin layer, it is possible to enhance the heat shielding properties of the laminated glass. Furthermore, it is possible to enhance the visible light transmittance of the laminated glass. In the present invention, it is possible to obtain laminated glass which is low in Tts serving as an index of heat shielding properties, and furthermore, it is possible to obtain laminated glass which is high in visible light transmittance as described above. For example, it is possible to allow the Tts of laminated glass to be 60% or less and allow the visible light transmittance to be 65% or more. Furthermore, it is also possible to allow the Tts to be 55% or less, it is also possible to allow the Tts to be 50% or less, and furthermore, it is possible to allow the visible light transmittance to be 70% or more.

Moreover, since the laminated glass is provided with the above-described configuration, it is possible to lower the Tds (Solar Direct Transmittance) serving as an index of heat shielding properties. For example, it is possible to allow the Tds of laminated glass to be 50% or less, it is also possible to allow the Tds to be 45% or less, and furthermore, it is possible to allow the Tds to be 40% or less.

The whole layer composed of two layers of the first laminated glass member and the first resin layer transmits a relatively large quantity of infrared rays. Furthermore, most of the infrared rays transmitted through the first laminated glass member and the first resin layer reach the infrared ray reflection layer. Infrared rays which have reached the infrared ray reflection layer are reflected by the infrared ray reflection layer. Moreover, because the infrared ray transmittance of the whole layer composed of the first laminated glass member and the first resin layer is high, most of the infrared rays reflected by the infrared ray reflection layer are transmitted through the first resin layer and the first laminated glass member. As a result, a rise in the temperature of an interlayer film at the time when infrared rays are made incident into the interlayer film can be suppressed. As such, the heat shielding properties of the interlayer film for laminated glass are enhanced, and furthermore, high visible light transmittance can be maintained over a long period of time since the film is excellent in light resistance. Moreover, by mounting the laminated glass on an opening part of a building or a vehicle, a rise in the temperature of an inner space of a building or a vehicle can be effectively suppressed.

On the other hand, if the first laminated glass member, the first resin layer and the infrared ray reflection layer transmit a part of infrared rays at all, the transmitted infrared rays reach the second resin layer or the second laminated glass member. Since the infrared ray transmittance of the whole layer composed of the second resin layer and the second laminated glass member is relatively low, the second resin layer and the second laminated glass member effectively cut off the transmission of infrared rays. As such, the quantity of heat rays passing through the whole laminated glass can be reduced. This also enables the heat shielding properties of the whole laminated glass to be enhanced, and by mounting the laminated glass on an opening part of a building or a vehicle, a rise in the temperature of an inner space of a building or a vehicle can be effectively suppressed.

Moreover, as a result of allowing the quantity of infrared rays which reach the second resin layer to be reduced, the deterioration of the second resin layer can be suppressed and the light resistance of the whole laminated glass is enhanced. As such, high visible light transmittance can be maintained over a long period of time. Furthermore, in the case where the second resin layer contains a heat shielding compound such as heat shielding particles, the deterioration of the heat shielding compound can also be suppressed and high heat shielding properties can be maintained over a long period of time.

It is preferred that the laminated glass according to the present invention be laminated glass which is mounted on an opening part between an outer space and an inner space into which heat rays are made incident from the outer space in a building or a vehicle. In this case, among the first and second laminated glass members, it is preferred that the first laminated glass member be arranged so as to be positioned at the outer space side.

Figure 1:
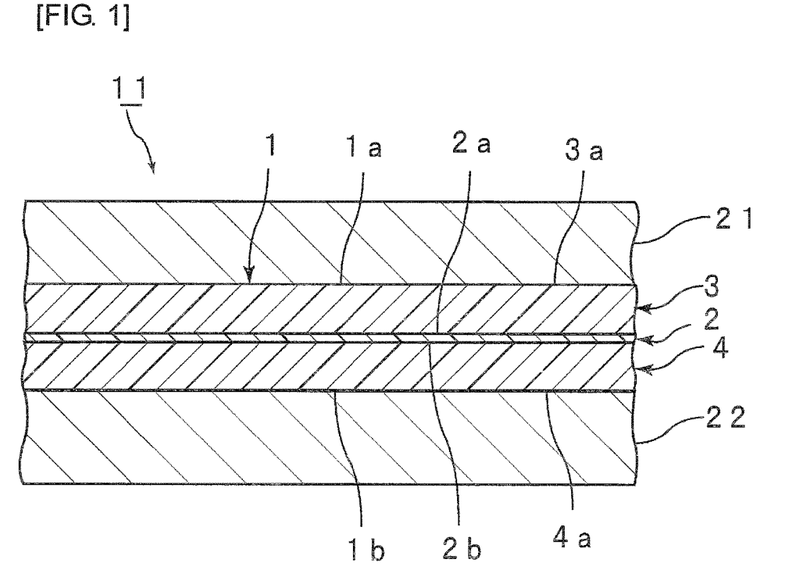
FIG. 1 is a partially cutout cross-sectional view showing laminated glass in accordance with one embodiment of the present invention.

FIG. 1 shows an example of laminated glass using the interlayer film for laminated glass in accordance with one embodiment of the present invention represented as a cross-sectional view.

Laminated glass 11 shown in FIG. 1 is provided with an interlayer film 1 and first and second laminated glass members 21 and 22. The interlayer film 1 is sandwiched between the first and second laminated glass members 21 and 22. The first laminated glass member 21 is layered on a first surface 1a of the interlayer film 1. The second laminated glass member 22 is layered on a second surface 1b opposite to the first surface 1a of the interlayer film 1. The first laminated glass member 21 is layered on an outer surface 3a of the first resin layer 3 in the interlayer film 1. The second laminated glass member 22 is layered on an outer surface 4a of the second resin layer 4 in the interlayer film 1.

Since it is easy to make the infrared ray transmittance of the whole layer composed of the first laminated glass member and the first resin layer higher than the infrared ray transmittance of the whole layer composed of the second laminated glass member and the second resin layer, it is preferred that the infrared ray transmittance in the wavelength of 780 to 2100 nm of the first resin layer be higher than the infrared ray transmittance in the wavelength of 780 to 2100 nm of the second resin layer, or the infrared ray transmittance in the wavelength of 780 to 2100 nm of the first laminated glass member be higher than the infrared ray transmittance in the wavelength of 780 to 2100 nm of the second laminated glass member. In this case, the infrared ray transmittance of the first resin layer and the infrared ray transmittance of the first laminated glass member may be higher than the infrared ray transmittance of the second resin layer and the infrared ray transmittance of the second laminated glass member, respectively.

From the viewpoint of further effectively enhancing the heat shielding properties, it is preferred that the infrared ray transmittance in the wavelength of 780 to 2100 nm of the first resin layer be higher than the infrared ray transmittance in the wavelength of 780 to 2100 nm of the second resin layer.

From the viewpoint of still further effectively enhancing the heat shielding properties, it is preferred that the infrared ray transmittance in the wavelength of 780 to 2100 nm of the first laminated glass member be higher than the infrared ray transmittance in the wavelength of 780 to 2100 nm of the second laminated glass member.

Examples of the first and second laminated glass members include a glass plate and a PET (polyethylene terephthalate) film and the like. As the laminated glass, laminated glass in which an interlayer film is sandwiched between a glass plate and a PET film or the like, as well as laminated glass in which an interlayer film is sandwiched between two glass plates, is included. Laminated glass is a laminate provided with a glass plate and it is preferred that at least one glass plate be used. It is preferred that the first and second laminated glass members be each a glass plate or a PET (polyethylene terephthalate) film and the interlayer film include at least one glass plate as the first and second laminated glass members. It is especially preferred that both of the first and second laminated glass members be glass plates.

Examples of the glass plate include a sheet of inorganic glass and a sheet of organic glass. Examples of the inorganic glass include float plate glass, heat ray-absorbing plate glass, heat ray-reflecting plate glass, polished plate glass, figured glass, wire plate glass, lined plate glass, green glass and the like. The organic glass is synthetic resin glass substituted for inorganic glass. Examples of the organic glass include a polycarbonate plate, a poly(meth)acrylic resin plate and the like. Examples of the poly(meth)acrylic resin plate include a polymethyl (meth)acrylate plate and the like.

It is preferred that the first laminated glass member and the second laminated glass member be each a sheet of clear glass or a sheet of heat ray-absorbing plate glass. Since the infrared ray transmittance is enhanced and the heat shielding properties of the laminated glass is further enhanced, it is preferred that the first laminated glass member be a sheet of clear glass. Since the infrared ray transmittance is lowered and the heat shielding properties of the laminated glass is further enhanced, it is preferred that the second laminated glass member be a sheet of heat ray-absorbing plate glass. It is preferred that the heat ray-absorbing plate glass be green glass. It is preferred that the first laminated glass member be a sheet of clear glass and the second laminated glass member be a sheet of heat ray-absorbing plate glass. The heat ray-absorbing plate glass is heat ray-absorbing plate glass in accordance with JIS R3208.

Although the thickness of each of the first and second laminated glass members is not particularly limited, the thickness is preferably 1 mm or more and preferably 5 mm or less. In the case where the laminated glass member is a glass plate, the thickness of the glass plate is preferably 1 mm or more and preferably 5 mm or less. In the case where the laminated glass member is a PET film, the thickness of the PET film is preferably 0.03 mm or more and preferably 0.5 mm or less.

The production method of the laminated glass is not particularly limited. For example, the interlayer film is sandwiched between the first and second laminated glass members and the air remaining between each of the first and second laminated glass members and the interlayer film is removed by allowing the laminated body to pass through a pressing roll or by putting the laminated body into a rubber bag and performing decompression suction to be sucked under reduced pressure. Afterward, the laminated body is preliminarily bonded together at about 70 to 100° C. to obtain a laminate. Next, by putting the laminate into an autoclave or by pressing the laminate, the laminate is press-bonded together at about 120 to 150° C. and under a pressure of 1 to 1.5 MPa. In this way, laminated glass can be obtained.

The laminated glass can be used for automobiles, railway vehicles, aircraft, ships, buildings and the like. It is preferred that the laminated glass be laminated glass for construction or for vehicles, and it is more preferred that the laminated glass be laminated glass for vehicles. The laminated glass can also be used for applications other than these applications. The laminated glass can be used for a windshield, side glass, rear glass or roof glass of an automobile and the like. Since the laminated glass is high in heat shielding properties and high in visible light transmittance, the laminated glass is suitably used for automobiles.

From the viewpoint of obtaining laminated glass further excellent in transparency, the visible light transmittance of laminated glass is preferably 60% or more, more preferably 65% or more, and further preferably 70% or more. The visible light transmittance of laminated glass can be measured in accordance with JIS R3211 (1998).

From the viewpoint of obtaining laminated glass further excellent in heat shielding properties, the Tts of laminated glass is preferably 60% or less, more preferably 55% or less, further preferably 53% or less, especially preferably 51% or less, and most preferably 50% or less. The Tts is measured in accordance with ISO 13837.

From the viewpoint of obtaining laminated glass further excellent in heat shielding properties, the Tds of laminated glass is preferably 50% or less, more preferably 45% or less, further preferably 43% or less, and especially preferably 41% or less. The Tds is measured in accordance with ISO 13837.

The infrared ray transmittance (Tir) is determined by measuring a value of infrared ray transmittance and normalizing the value with weighting factors described in JIS 28722 and JIS R3106.

The infrared ray transmittance T1 in the wavelength of 780 to 2100 nm of the whole layer composed of a first laminated glass member and a first resin layer is measured in the following manner.

Laminated glass in which a first laminated glass member, a first resin layer and a sheet of clear glass (2.5 mm in thickness) are layered in this order is prepared. Weighting factors in the range of 780 to 2100 nm shown in Appendix Table 2 in JIS R3106 (1998) are used to normalize weighting factors to obtain new weighting factors. Then, the spectral transmittance in the wavelength of 780 to 2100 nm of the laminated glass is obtained in accordance with JIS R3106 (1998) using a spectrophotometer ("U-4100" available from Hitachi High-Technologies Corporation). By multiplying the obtained spectral transmittance by the newly normalized weighting factors, the infrared ray transmittance in the wavelength of 780 to 2100 nm is determined.

The infrared ray transmittance T2 in the wavelength of 780 to 2100 nm of the whole layer composed of a second laminated glass member and a second resin layer is measured in the following manner.

Laminated glass in which a second laminated glass member, a second resin layer and a sheet of clear glass (2.5 mm in thickness) are layered in this order is prepared. Weighting factors in the range of 780 to 2100 nm shown in Appendix Table 2 in JIS R3106 (1998) are used to normalize weighting factors to obtain new weighting factors. Then, the spectral transmittance in the wavelength of 780 to 2100 nm of the laminated glass is obtained in accordance with JIS R3106 (1998) using a spectrophotometer ("U-4100" available from Hitachi High-Technologies Corporation). By multiplying the obtained spectral transmittance by the newly normalized weighting factors, the infrared ray transmittance in the wavelength of 780 to 2100 nm is determined.

Moreover, specifically, the infrared ray transmittance in the wavelength of 780 to 2100 nm of a first resin layer, a second resin layer or the like is measured in the following manner.

A first resin layer or a second resin layer (an object to be measured) and the like are interposed between two sheets of clear glass to prepare laminated glass. Weighting factors in the range of 780 to 2100 nm shown in Appendix Table 2 in JIS R3106 (1998) are used to normalize weighting factors to obtain new weighting factors. Then, the spectral transmittance in the wavelength of 780 to 2100 nm of the laminated glass is obtained in accordance with JIS R3106 (1998) using a spectrophotometer ("U-4100" available from Hitachi High-Technologies Corporation). By multiplying the obtained spectral transmittance by the newly normalized weighting factors, the infrared ray transmittance in the wavelength of 780 to 2100 nm is determined.

The haze value of the laminated glass is preferably 2% or less, more preferably 1% or less, further preferably 0.5% or less, and especially preferably 0.4% or less. The haze value of laminated glass can be measured in accordance with JIS K6714.

(Method of Mounting Laminated Glass)

The method of mounting laminated glass according to the present invention is a method of mounting the above-described laminated glass for a building or a vehicle on an opening part between an outer space and an inner space into which heat rays are made incident from the outer space.

Specifically, the laminated glass is mounted on the opening part so that the first laminated glass member is positioned at the outer space side and the second laminated glass member is positioned at the inner space side. That is, the laminated glass is mounted so that an arrangement order of outer space/first laminated glass member/(another layer/) first resin layer/(another layer/) infrared ray reflection layer/ (another layer/) second resin layer/(another layer/) second laminated glass member/inner space is attained. Preferably, it is preferred that an arrangement order of outer space/first laminated glass member/first resin layer/(another layer/) infrared ray reflection layer/(another layer/) second resin layer/second laminated glass member/inner space be attained, it is preferred that an arrangement order of outer space/first laminated glass member/(another layer/) first resin layer/infrared ray reflection layer/second resin layer/(another layer/) second laminated glass member/inner space be attained, and it is preferred that an arrangement order of outer space/first laminated glass member/first resin layer/infrared ray reflection layer/second resin layer/second laminated glass member/inner space be attained. In the above-mentioned arrangement forms, the case where another member is arranged between the outer space and the first laminated glass member is included, and the case where another member is arranged between the inner space and the second laminated glass member is included.

In the layered structure, each of another layer mentioned above and another member mentioned above may be present or may be absent. Sunlight containing heat rays is made incident into laminated glass from an outer space, and the sunlight containing heat rays, which has passed through the laminated glass, is led to an inner space. In the case where laminated glass is mounted on an opening part as mentioned above, the outer surface of the first laminated glass member constitutes the incident face for heat rays. Moreover, heat rays are made incident into the first resin layer earlier than the second resin layer.

Hereinafter, the present invention will be described in more detail with reference to examples. The present invention is not limited only to the following examples.

The following materials were used to form first and second resin layers.

Thermoplastic Resin:
Polyvinyl butyral resins PVB1 to PVB7 (any of these is a polyvinyl butyral resin (PVB) acetalized with n-butyl aldehyde) shown in the following Table 1 were prepared.

TABLE 1

| Kind of thermo-plastic resin | Average polymeri-zation degree | Content ratio of hydroxyl group (mol %) | Acety-lation degree (mol %) | Butyrali-zation degree (mol %) |
|---|---|---|---|---|
| PVB1 | 1700 | 30.5 | 1 | 68.5 |
| PVB2 | 1700 | 19 | 20 | 61 |
| PVB3 | 1700 | 16.5 | 0.5 | 83 |
| PVB4 | 1700 | 38.5 | 1 | 60.5 |
| PVB5 | 3000 | 22 | 13 | 65 |
| PVB6 | 3000 | 19 | 20 | 61 |
| PVB7 | 3000 | 16.5 | 0.5 | 83 |

Plasticizer:
3GO (triethylene glycol di-2-ethylhexanoate)
Other Ingredients:
BHT (an oxidation inhibitor, 2,6-di-t-butyl-p-cresol)
T-460 (2,4-bis[2-hydroxy-4-butoxyphenyl]-6-(2,4-dibutoxyphenyl)-1,3,5-triazine, "Tinuvin 460" available from BASF Japan Ltd.)
T-326 (an ultraviolet ray shielding agent, (2'-hydroxy-3'-t-butyl-5-methylphenyl)-5-chlorobenzotriazole, "Tinuvin 326" available from BASF Japan Ltd.)
LAF70 (an ultraviolet ray shielding agent, triazine-based ultraviolet ray shielding agent, "LA-F70" available from ADEKA CORPORATION)
VSU (an ultraviolet ray shielding agent, 2-ethyl-2'-ethoxy-oxanilide, "Sanduvor VSU" available from Clariant Japan K.K.)
PR25 (an ultraviolet ray shielding agent, malonic acid[(4-methoxyphenyl)-methylene]-dimethyl ester, "Hostavin PR-25" available from Clariant Japan K.K.)
ITO (ITO particles, tin-doped indium oxide particles)
CWO (CWO particles, cesium-doped tungsten oxide ($Cs_{0.33}WO_3$) particles)
43V (Ingredient X, a phthalocyanine compound, "NIR-43V" available from YAMADA CHEMICAL CO., LTD. which contains a vanadium atom as the central metal)
SG-5A1257 (Ingredient X, a phthalocyanine compound which contains a copper atom, "BLUE SG-5A1257" available from SUMIKA COLOR CO., LTD.)

Moreover, the following infrared ray reflection layer was prepared.
XIR-75 (a resin film with metal foil, "XIR-75" available from Southwall Technologies Inc.)
Multilayer film (3M, a multilayer resin film, "Multilayer Nano 80S" available from 3M Japan Limited)

Moreover, the following laminated glass members (sheets of glass) were prepared.
Clear glass (100 cm in longitudinal length by 100 cm in transversal length by 2 mm in thickness)
Green glass (heat ray-absorbing plate glass in accordance with JIS 83208, 100 cm in longitudinal length by 100 cm in transversal length by 2 mm in thickness)

(Preparation of Resin Layer A1)
To 100 parts by weight of a polyvinyl butyral resin (PVB1), 40 parts by weight of a plasticizer (3GO), 0.8 parts by weight of an ultraviolet ray shielding agent (T-326) and 0.2 parts by weight of an oxidation inhibitor (BHT) were added and thoroughly kneaded with a mixing roll to obtain a composition.

The composition obtained was extruded by an extruder to obtain a single-layered resin layer A1 with a thickness of 380 μm.

(Preparation of Resin Layers A2 to A7)
Single-layered resin layers A2 to A7 with a thickness of 380 μm were obtained in the same manner as that for the resin layer A1 except that the kind of ingredients to be blended and the blending amount thereof were set to those listed in the following Table 2.

TABLE 2

| | Composition of first resin layer | | | | |
|---|---|---|---|---|---|
| Kind of | PVB | | 3GO | T-326 | BHT |
| first resin layer | Kind | Part(s) by weight | Part(s) by weight | Part(s) by weight | Part(s) by weight |
| A1 | PVB1 | 100 | 40 | 0.8 | 0.2 |
| A2 | PVB1 | 100 | 36 | 0.2 | 0.2 |
| A3 | PVB1 | 100 | 36 | 0.8 | 0.2 |
| A4 | PVB1 | 100 | 40 | 0.2 | 0.2 |
| A5 | PVB2 | 100 | 36 | 0.8 | 0.2 |
| A6 | PVB3 | 100 | 36 | 0.8 | 0.2 |
| A7 | PVB4 | 100 | 36 | 0.8 | 0.2 |

(Preparation of Resin Layer B1)
Forty parts by weight of a plasticizer (3GO) and ITO in an amount that the content thereof in the resulting resin layer B1 becomes 0.39% by weight were mixed, and the mixture was thoroughly kneaded to obtain a plasticizer dispersion. To 100 parts by weight of a polyvinyl butyral resin (PVB1), the whole amount of the plasticizer dispersion and 0.2 parts by weight of an oxidation inhibitor (BHT) were added and thoroughly kneaded with a mixing roll to obtain a composition.

The composition obtained was extruded by an extruder to obtain a single-layered resin layer B1 with a thickness of 380 μm.

(Preparation of Resin Layers B2 to B17)

Single-layered resin layers B2 to B17 with a thickness of 380 μm were prepared in the same manner as that for the resin layer B1 except that the kind of ingredients to be blended and the content thereof were set to those listed in the following Table 3.

In this connection, in the following Table 3, the amounts of PVB1, 3GO, BHT, T-326, T-460, LAF70, VSU and PR25 blended refer to the blending amounts thereof (part(s) by weight) relative to 100 parts by weight of the polyvinyl butyral resin (PVB). The amounts of ITO, CWO, 43V and SG-5A1257 blended refer to the blending amounts thereof (% by weight) in 100% by weight of the resin layer.

laminate, interlayer film portions protruded from the glass plate were cut away to obtain a sheet of laminated glass.

Examples 2 to 29

Interlayer films and sheets of laminated glass were prepared in the same manner as that in Example 1 except that the kind of first and second resin layers, the kind of an infrared ray reflection layer and the kind of first and second laminated glass members (glass) were set to those listed in the following Tables 4 to 6.

Comparative Example 1

Without using an infrared ray reflection layer, a resin layer A1 obtained and a resin layer A1 obtained were layered to

TABLE 3

| Kind of second resin layer | Composition of second resin layer | | | | | | | | | | | |
|---|---|---|---|---|---|---|---|---|---|---|---|---|
| | PVB1 Part(s) by weight | 3GO Part(s) by weight | BHT Part(s) by weight | T-326 Part(s) by weight | T-460 Part(s) by weight | LAF70 Part(s) by weight | VSU Part(s) by weight | PR25 Part(s) by weight | ITO % by weight | CWO % by weight | 43V % by weight | SG-5A1257 % by weight |
| B1 | 100 | 40 | 0.2 | — | — | — | — | — | 0.39 | — | — | — |
| B2 | 100 | 40 | 0.2 | — | — | — | — | — | 1.4 | — | — | — |
| B3 | 100 | 40 | 0.2 | — | 0.6 | — | 0.4 | 0.4 | 0.8 | — | 0.008 | — |
| B4 | 100 | 40 | 0.2 | — | — | 0.25 | 0.4 | 0.4 | 0.24 | 0.048 | 0.012 | — |
| B5 | 100 | 40 | 0.2 | 0.8 | — | — | — | — | 0.4 | — | 0.008 | — |
| B6 | 100 | 40 | 0.2 | 0.8 | — | — | — | — | 0.2 | — | — | — |
| B7 | 100 | 40 | 0.2 | 0.8 | — | — | — | — | 0.8 | 0.1 | 0.006 | — |
| B8 | 100 | 40 | 0.2 | 0.8 | — | — | — | — | 0.8 | — | 0.012 | — |
| B9 | 100 | 36 | 0.4 | 0.8 | — | — | — | — | 0.8 | — | 0.009 | — |
| B10 | 100 | 36 | 0.4 | 0.8 | — | — | — | — | 1.2 | — | 0.009 | — |
| B11 | 100 | 36 | 0.4 | 0.8 | — | — | — | — | 0.7 | — | 0.007 | — |
| B12 | 100 | 36 | 0.4 | 0.8 | — | — | — | — | 1.3 | — | 0.014 | — |
| B13 | 100 | 36 | 0.4 | 0.8 | — | — | — | — | 1.7 | — | 0.018 | — |
| B14 | 100 | 36 | 0.4 | 0.8 | — | — | — | — | 1.1 | — | 0.012 | 0.0013 |
| B15 | 100 | 36 | 0.4 | 0.8 | — | — | — | — | 1.3 | — | 0.014 | 0.001 |
| B16 | 100 | 40 | 0.2 | 0.2 | — | — | — | — | 0.39 | — | — | — |
| B17 | 100 | 40 | 0.2 | 0.4 | — | — | — | — | 1.4 | — | — | — |

Example 1

(1) Preparation of Interlayer Film for Laminated Glass

As an infrared ray reflection layer, XIR-75 (a resin film with metal foil, "XIR-75" available from Southwall Technologies Inc.) was prepared.

The XIR-75 prepared was used as an infrared ray reflection layer and the infrared ray reflection layer was sandwiched between a resin layer A1 obtained and a resin layer B3 obtained to obtain an interlayer film.

(2) Preparation of Laminated Glass

The interlayer film obtained was cut into a size of 30 cm in longitudinal length by 30 cm in transversal length. Moreover, a sheet of clear glass (30 cm in longitudinal length by 30 cm in transversal length by 2 mm in thickness) and a sheet of green glass (heat ray-absorbing plate glass in accordance with JIS R3208, 30 cm in longitudinal length by 30 cm in transversal length by 2 mm in thickness) were prepared. The interlayer film obtained was sandwiched between the clear glass and the green glass, held in place for 30 minutes at 90° C. and pressed under vacuum with a vacuum laminator to obtain a laminate. With regard to the obtain an interlayer film. A sheet of laminated glass was obtained in the same manner as that in Example 1 except that the interlayer film obtained was used.

Comparative Example 2

The same infrared ray reflection layer as that in Example 1 was sandwiched between a resin layer A1 obtained and a resin layer A1 obtained to obtain an interlayer film. A sheet of laminated glass was obtained in the same manner as that in Example 1 except that the interlayer film obtained was used and a sheet of clear glass was used as the second laminated glass member.

Comparative Example 3

As an infrared ray reflection layer, Multilayer film (3M, a multilayer resin film, "Multilayer Nano 80S" available from 3M Japan Limited) was prepared.

The Multilayer film prepared was used alone as an infrared ray reflection layer and the infrared ray reflection layer was sandwiched between a resin layer A1 obtained and a resin layer A1 obtained to obtain an interlayer film. A sheet of laminated glass was obtained in the same manner as that in Example 1 except that the interlayer film obtained was used and a sheet of clear glass was used as the second laminated glass member.

Comparative Example 4

As an infrared ray reflection layer, Multilayer film (3M, a multilayer resin film, "Multilayer Nano 80S" available from 3M Japan Limited) was prepared.

The Multilayer film prepared was used alone as an infrared ray reflection layer and the infrared ray reflection layer was sandwiched between a resin layer A1 obtained and a resin layer A1 obtained to obtain an interlayer film. A sheet of laminated glass was obtained in the same manner as that in Example 1 except that the interlayer film obtained was used and the sheet of clear glass as the first laminated glass member was changed to a sheet of green glass.

(Evaluation)

(1) Measurement of Visible Light Transmittance (a Light Y Value, A-Y (380 to 780 nm))

The laminated glass obtained was measured for the visible light transmittance in the wavelength of 380 to 780 nm in accordance with JIS 83211 (1998) using a spectrophotometer ("U-4100" available from Hitachi High-Technologies Corporation).

(2) Measurement of Tds (Direct Solar Energy Transmitted Through a Glazing)

The laminated glass obtained was measured for the Tds in the wavelength of 300 to 2500 nm in accordance with ISO 13837 using a spectrophotometer ("U-4100" available from Hitachi High-Technologies Corporation).

(3) Measurement of Tts (Total Solar Energy Transmitted Through a Glazing)

The transmittance/reflectance in the wavelength of 300 to 2500 nm was measured using a spectrophotometer ("U-4100" available from Hitachi High-Technologies Corporation) in accordance with ISO 13837 and the Tts was calculated.

The layered configuration of laminated glass and evaluation results are shown in the following Tables 4 to 6. Moreover, when the infrared ray transmittance in the wavelength of 780 to 2100 nm of the whole layer composed of the first laminated glass member and the first resin layer is defined as T1 and the infrared ray transmittance in the wavelength of 780 to 2100 nm of the whole layer composed of the second laminated glass member and the second resin layer is defined as T2, the relationship between the T1 and the T2 is described in the column of "The two layers" of the Infrared ray transmittance of the following Tables 4 to 6. When the infrared ray transmittance in the wavelength of 780 to 2100 nm of the first resin layer is defined as Tx1 and the infrared ray transmittance in the wavelength of 780 to 2100 nm of the second resin layer is defined as Tx2, the relationship between the Tx1 and the Tx2 is described in the column of "Resin layer" of the Infrared ray transmittance of the following Tables 4 to 6. When the infrared ray transmittance in the wavelength of 780 to 2100 nm of the first laminated glass member is defined as Ty1 and the infrared ray transmittance in the wavelength of 780 to 2100 nm of the second laminated glass member is defined as Ty2, the relationship between the Ty1 and the Ty2 is described in the column of "Laminated glass member" of the Infrared ray transmittance of the following Tables 4 to 6.

In this connection, the infrared ray transmittance T1 in the wavelength of 780 to 2100 nm of the whole layer composed of the first laminated glass member and the first resin layer was measured in the following manner. Laminated glass in which a first laminated glass member, a first resin layer and a sheet of clear glass (2.5 mm in thickness) are layered in this order was prepared. Weighting factors in the range of 780 to 2100 nm shown in Appendix Table 2 in JIS R3106 (1998) were used to normalize weighting factors to obtain new weighting factors. Then, the spectral transmittance in the wavelength of 780 to 2100 nm of the laminated glass was obtained in accordance with JIS R3106 (1998) using a spectrophotometer ("U-4100" available from Hitachi High-Technologies Corporation). By multiplying the obtained spectral transmittance by the newly normalized weighting factors, the infrared ray transmittance T1 in the wavelength of 780 to 2100 nm was determined.

The infrared ray transmittance T2 in the wavelength of 780 to 2100 nm of the whole layer composed of the second laminated glass member and the second resin layer was measured in the following manner. Laminated glass in which a second laminated glass member, a second resin layer and a sheet of clear glass (2.5 mm in thickness) are layered in this order was prepared. Weighting factors in the range of 780 to 2100 nm shown in Appendix Table 2 in JIS R3106 (1998) were used to normalize weighting factors to obtain new weighting factors. Then, the spectral transmittance in the wavelength of 780 to 2100 nm of the laminated glass was obtained in accordance with JIS R3106 (1998) using a spectrophotometer ("U-4100" available from Hitachi High-Technologies Corporation). By multiplying the obtained spectral transmittance by the newly normalized weighting factors, the infrared ray transmittance T2 in the wavelength of 780 to 2100 nm was determined.

Moreover, the infrared ray transmittance Tx1 or Tx2 in the wavelength of 780 to 2100 nm of a first resin layer or a second resin layer was measured in the following manner. A first resin layer or a second resin layer was interposed between two sheets of clear glass (2.5 mm in thickness) to prepare laminated glass. Weighting factors in the range of 780 to 2100 nm shown in Appendix Table 2 in JIS R3106 (1998) were used to normalize weighting factors to obtain new weighting factors. Then, the spectral transmittance in the wavelength of 780 to 2100 nm of the laminated glass was obtained in accordance with JIS R3106 (1998) using a spectrophotometer ("U-4100" available from Hitachi High-Technologies Corporation). By multiplying the obtained spectral transmittance by the newly normalized weighting factors, the infrared ray transmittance in the wavelength of 780 to 2100 nm was determined.

TABLE 4

| | Layered configuration | | | | | Infrared ray transmittance | | | Evaluation | | |
|---|---|---|---|---|---|---|---|---|---|---|---|
| | First laminated glass member | First resin layer | Infrared ray reflection layer | Second resin layer | Second laminated glass member | The two layers | Resin layer | Laminated glass member | A − Y (%) | Tds (%) | Tts (%) |
| Ex. 1 | Clear | A1 | XIR-75 | B3 | Green | T1 > T2 | Tx1 > Tx2 | Ty1 > Ty2 | 66.8 | 34.2 | 45.5 |
| Ex. 2 | Clear | A1 | XIR-75 | B2 | Green | T1 > T2 | Tx1 > Tx2 | Ty1 > Ty2 | 66.7 | 35.8 | 46.7 |
| Ex. 3 | Clear | A1 | XIR-75 | B1 | Clear | T1 > T2 | Tx1 > Tx2 | Ty1 = Ty2 | 74.3 | 45.1 | 53.4 |

TABLE 4-continued

| | Layered configuration | | | | | Infrared ray transmittance | | | Evaluation | | |
|---|---|---|---|---|---|---|---|---|---|---|---|
| | First laminated glass member | First resin layer | Infrared ray reflection layer | Second resin layer | Second laminated glass member | The two layers | Resin layer | Laminated glass member | A − Y (%) | Tds (%) | Tts (%) |
| Ex. 4 | Green | A1 | XIR-75 | B1 | Green | T1 > T2 | Tx1 > Tx2 | Ty1 = Ty2 | 71.4 | 39.3 | 49.2 |
| Ex. 5 | Green | A1 | Multilayer film | B2 | Green | T1 > T2 | Tx1 > Tx2 | Ty1 = Ty2 | 72.8 | 37.3 | 51.2 |
| Ex. 6 | Clear | A1 | Multilayer film | B2 | Green | T1 > T2 | Tx1 > Tx2 | Ty1 > Ty2 | 76.9 | 41.9 | 52.3 |
| Ex. 7 | Green | A1 | Multilayer film | B4 | Green | T1 > T2 | Tx1 > Tx2 | Ty1 = Ty2 | 71.3 | 34.1 | 48.9 |
| Ex. 8 | Clear | A1 | Multilayer film | B4 | Green | T1 > T2 | Tx1 > Tx2 | Ty1 > Ty2 | 75.2 | 38.3 | 49.7 |
| Ex. 9 | Clear | A1 | Multilayer film | B4 | Clear | T1 > T2 | Tx1 > Tx2 | Ty1 = Ty2 | 79.6 | 43.5 | 53.5 |
| Ex. 10 | Green | A1 | Multilayer film | B3 | Green | T1 > T2 | Tx1 > Tx2 | Ty1 = Ty2 | 72.9 | 35.7 | 50.0 |
| Ex. 11 | Clear | A1 | Multilayer film | B3 | Green | T1 > T2 | Tx1 > Tx2 | Ty1 > Ty2 | 77.0 | 40.1 | 51.0 |
| Ex. 12 | Green | A1 | Multilayer film | B1 | Green | T1 > T2 | Tx1 > Tx2 | Ty1 = Ty2 | 75.8 | 41.1 | 54.0 |

TABLE 5

| | Layered configuration | | | | | Infrared ray transmittance | | | Evaluation | | |
|---|---|---|---|---|---|---|---|---|---|---|---|
| | First laminated glass member | First resin layer | Infrared ray reflection layer | Second resin layer | Second laminated glass member | The two layers | Resin layer | Laminated glass member | A − Y (%) | Tds (%) | Tts (%) |
| Ex. 13 | Clear | A2 | Multilayer film | B9 | Green | T1 > T2 | Tx1 > Tx2 | Ty1 > Ty2 | 77.7 | 39.7 | 50.7 |
| Ex. 14 | Clear | A3 | Multilayer film | B9 | Green | T1 > T2 | Tx1 > Tx2 | Ty1 > Ty2 | 77.7 | 40.0 | 50.5 |
| Ex. 15 | Clear | A4 | Multilayer film | B9 | Green | T1 > T2 | Tx1 > Tx2 | Ty1 > Ty2 | 77.8 | 40.2 | 50.8 |
| Ex. 16 | Clear | A5 | Multilayer film | B9 | Green | T1 > T2 | Tx1 > Tx2 | Ty1 > Ty2 | 77.9 | 40.3 | 50.7 |
| Ex. 17 | Clear | A6 | Multilayer film | B9 | Green | T1 > T2 | Tx1 > Tx2 | Ty1 > Ty2 | 77.8 | 40.2 | 50.8 |
| Ex. 18 | Clear | A5 | Multilayer film | B10 | Green | T1 > T2 | Tx1 > Tx2 | Ty1 > Ty2 | 75.4 | 36.7 | 48.2 |
| Ex. 19 | Clear | A2 | Multilayer film | B11 | Green | T1 > T2 | Tx1 > Tx2 | Ty1 > Ty2 | 79.2 | 41.0 | 51.7 |
| Ex. 20 | Clear | A2 | Multilayer film | B12 | Green | T1 > T2 | Tx1 > Tx2 | Ty1 > Ty2 | 76.7 | 37.7 | 49.2 |
| Ex. 21 | Clear | A2 | Multilayer film | B13 | Green | T1 > T2 | Tx1 > Tx2 | Ty1 > Ty2 | 73.7 | 34.2 | 46.6 |
| Ex. 22 | Clear | A3 | Multilayer film | B14 | Green | T1 > T2 | Tx1 > Tx2 | Ty1 > Ty2 | 73.2 | 35.9 | 47.5 |
| Ex. 23 | Clear | A3 | Multilayer film | B15 | Green | T1 > T2 | Tx1 > Tx2 | Ty1 > Ty2 | 72.8 | 34.8 | 46.7 |

TABLE 6

| | Layered configuration | | | | | Infrared ray transmittance | | | Evaluation | | |
|---|---|---|---|---|---|---|---|---|---|---|---|
| | First laminated glass member | First resin layer | Infrared ray reflection layer | Second resin layer | Second laminated glass member | The two layers | Resin layer | Laminated glass member | A − Y (%) | Tds (%) | Tts (%) |
| Ex. 24 | Clear | A1 | XIR-75 | B17 | Green | T1 > T2 | Tx1 > Tx2 | Ty1 > Ty2 | 66.7 | 35.8 | 46.7 |
| Ex. 25 | Clear | A1 | XIR-75 | B16 | Clear | T1 > T2 | Tx1 > Tx2 | Ty1 = Ty2 | 74.3 | 45.1 | 53.4 |
| Ex. 26 | Green | A1 | XIR-75 | B16 | Green | T1 > T2 | Tx1 > Tx2 | Ty1 > Ty2 | 71.4 | 39.3 | 49.2 |
| Ex. 27 | Green | A1 | Multilayer film | B17 | Green | T1 > T2 | Tx1 > Tx2 | Ty1 = Ty2 | 72.8 | 37.3 | 51.2 |
| Ex. 28 | Clear | A1 | Multilayer film | B17 | Green | T1 > T2 | Tx1 > Tx2 | Ty1 > Ty2 | 76.9 | 41.9 | 52.3 |
| Ex. 29 | Green | A1 | Multilayer film | B16 | Green | T1 > T2 | Tx1 > Tx2 | Ty1 = Ty2 | 75.8 | 41.1 | 54.0 |
| Comp. Ex. 1 | Clear | A1 | — | A1 | Green | T1 > T2 | Tx1 = Tx2 | Ty1 > Ty2 | 83.8 | 62.7 | 71.2 |
| Comp. Ex. 2 | Clear | A1 | XIR-75 | A1 | Clear | T1 = T2 | Tx1 = Tx2 | Ty1 = Ty2 | 75.6 | 47.5 | 55.1 |
| Comp. Ex. 3 | Clear | A1 | Multilayer film | A1 | Clear | T1 = T2 | Tx1 = Tx2 | Ty1 = Ty2 | 83.1 | 54.5 | 61.6 |
| Comp. Ex. 4 | Green | A1 | Multilayer film | A1 | Green | T1 = T2 | Tx1 = Tx2 | Ty1 = Ty2 | 75.6 | 45.7 | 57.0 |

EXPLANATION OF SYMBOLS

1: Interlayer film
1a: First surface
b: Second surface
2: Infrared ray reflection layer
2a': First surface
2b: Second surface
3: First resin layer
3a: Outer surface
4: Second resin layer
4a: Outer surface
11: Laminated glass
21: First laminated glass member
22: Second laminated glass member

The invention claimed is:

1. A laminated glass comprising a first laminated glass member, a second laminated glass member and an interlayer film arranged between the first laminated glass member and the second laminated glass member,
the interlayer film being provided with an infrared ray reflection layer which reflects infrared rays, a first resin layer which is arranged on a first surface side of the infrared ray reflection layer and contains a polyvinyl acetal resin, a plasticizer, an ultraviolet ray shielding agent and an oxidation inhibitor, and a second resin layer which is arranged on a second surface side opposite to the first surface of the infrared ray reflection layer and contains a polyvinyl acetal resin, a plasticizer, an ultraviolet ray shielding agent, an oxidation inhibitor and heat shielding compounds, the first layer further containing one or more heat shielding compounds or not containing a heat shielding compound, the heat shielding compounds of the second resin layer comprising metal oxide particles and at least one of a phthalocyanine compound, a naphthalocyanine compound, and an anthracyanine compound, the content in % by weight of the one or more heat shielding compounds in the first resin layer is smaller than the content in % by weight of the heat shielding compounds in the second resin layer by 005% by weight or more, the content of the oxidation inhibitor in 100% by weight of the first resin layer being 0.1% by weight or more and 2% by weight or less and the content of the oxidation inhibitor in 100% by weight of the second resin layer being 0.1% by weight or more and 2% by weight or less, the content of the metal oxide particles in 100% by weight of the second resin layer being 0.1% by weight or more and 6% by weight or less, the first laminated glass member being arranged on the outside of the first resin layer in the interlayer film, the second laminated glass member being arranged on the outside of the second resin layer in the interlayer film, and the infrared ray transmittance in the wavelength of 780 to 2100 nm of the whole layer composed of the first laminated glass member and the first resin layer being higher than the infrared ray transmittance in the wavelength of 780 to 2100 nm of the whole layer composed of the second laminated glass member and the second resin layer.

2. The laminated glass according to claim 1, wherein the infrared ray transmittance in the wavelength of 780 to 2100 nm of the first resin layer is higher than the infrared ray transmittance in the wavelength of 780 to 2100 nm of the second resin layer, or the infrared ray transmittance in the wavelength of 780 to 2100 nm of the first laminated glass member is higher than the infrared ray transmittance in the wavelength of 780 to 2100 nm of the second laminated glass member.

3. The laminated glass according to claim 1, wherein the infrared ray transmittance in the wavelength of 780 to 2100 nm of the first resin layer is higher than the infrared ray transmittance in the wavelength of 780 to 2100 nm of the second resin layer.

4. The laminated glass according to claim 1, wherein the infrared ray transmittance in the wavelength of 780 to 2100 nm of the first laminated glass member is higher than the infrared ray transmittance in the wavelength of 780 to 2100 nm of the second laminated glass member.

5. The laminated glass according to claim 1, wherein the infrared ray transmittance in the wavelength of 780 to 2100 nm of the first resin layer is higher than the infrared ray transmittance in the wavelength of 780 to 2100 nm of the second resin layer, and the infrared ray transmittance in the wavelength of 780 to 2100 nm of the first laminated glass member is higher than the infrared ray transmittance in the wavelength of 780 to 2100 nm of the second laminated glass member.

6. The laminated glass according to claim 1, wherein the infrared ray reflection layer is a resin film with metal foil, a multilayer laminated film in which a metal layer and a dielectric layer are formed on a resin layer, a multilayer resin film or a liquid crystal film.

7. The laminated glass according to claim 1, wherein the metal oxide particles are tin-doped indium oxide particles or tungsten oxide particles.

8. A method of mourning laminated glass according to claim 1 for a building or a vehicle on an opening part between an outer space and an inner space into which heat rays are made incident from the outer space, comprising the step of mounting the laminated glass on the opening part so that the first laminated glass member is positioned at the outer space side and the second laminated glass member is positioned at the inner space side.

9. The laminated glass according to claim 1, wherein each ultraviolet ray shielding agent is a benzotriazole compound, a benzophenone compound, a triazine compound, a malonic acid ester compound, an oxalic anilide compound, or a benzoate compound.

10. The laminated glass according to claim 1, wherein the content of the ultraviolet ray shielding agent in 100% by weight of the first resin layer is 0.1% by weight or more.

11. The laminated glass according to claim 1, wherein the content of the ultraviolet ray shielding agent in 100% by weight of the first resin layer is 0.1% by weight or more and 0.8% by weight or less.

12. The laminated glass according to claim 1, wherein the content of the ultraviolet ray shielding agent in 100% by weight of the second resin layer is 0.1% by weight or more.

13. The laminated glass according to claim 1, wherein the content of the ultraviolet ray shielding agent in 100% by weight of the second resin layer is 0.1% by weight or more and 0.8% by weight or less.

14. The laminated glass according to claim 1, wherein the interlayer film further comprises a fluorescent brightening agent.

15. The laminated glass according to claim 1, wherein the at least one of a phthalocyanine compound, a naphthalocyanine compound, and an anthracyanine compound contains a vanadium atom or a copper atom and is selected from the group consisting of naphthalocyanine, a derivative of naphthalocyanine, anthracyanine, and a derivative of anthracyanine.

* * * * *